United States Patent
Huang et al.

(10) Patent No.: US 12,492,166 B2
(45) Date of Patent: Dec. 9, 2025

(54) SULFONYLUREA DERIVATIVE AND MEDICAL USES THEREOF

(71) Applicants: SHANGHAI SENHUI MEDICINE CO., LTD., Shanghai (CN); SHANGHAI SHENGDI PHARMACEUTICAL CO., LTD, Shanghai (CN); JIANGSU HENGRUI PHARMACEUTICALS CO., LTD., Lianyungang (CN)

(72) Inventors: Jian Huang, Shanghai (CN); Lingjian Zhu, Shanghai (CN); Xiuzhao Yu, Shanghai (CN); Piaoyang Sun, Lianyungang (CN)

(73) Assignees: SHANGHAI SENHUI MEDICINE CO., LTD, Shanghai (CN); SHANGHAI SHENGDI PHARMACEUTICAL CO., LTD, Shanghai (CN); JIANGSU HENGRUI PHARMACEUTICALS CO., LTD., Lianyungang (CN)

( * ) Notice: Subject to any disclaimer, the term of this patent is extended or adjusted under 35 U.S.C. 154(b) by 505 days.

(21) Appl. No.: 18/016,640

(22) PCT Filed: Jul. 16, 2021

(86) PCT No.: PCT/CN2021/106746
§ 371 (c)(1),
(2) Date: Jan. 17, 2023

(87) PCT Pub. No.: WO2022/012666
PCT Pub. Date: Jan. 20, 2022

(65) Prior Publication Data
US 2023/0348371 A1    Nov. 2, 2023

(30) Foreign Application Priority Data

Jul. 17, 2020    (CN) .......................... 202010690191.4

(51) Int. Cl.
*C07C 311/59*    (2006.01)
*A61P 25/00*    (2006.01)
*C07D 231/22*    (2006.01)

(52) U.S. Cl.
CPC ........ *C07C 311/59* (2013.01); *C07B 2200/05* (2013.01); *C07C 2601/14* (2017.05)

(58) Field of Classification Search
CPC . C07C 311/59; C07C 2601/14; C07D 231/22; C07B 2200/05; A61P 25/00
See application file for complete search history.

(56) References Cited

U.S. PATENT DOCUMENTS 7,285,574 B2    10/2007  Simard et al.
2010/0130615 A1    5/2010  Gant

FOREIGN PATENT DOCUMENTS

| CN | 1111238 A | 11/1995 |
| CN | 101217962 A | 7/2008 |
| CN | 103108637 A | 5/2013 |
| CN | 104127424 A | 11/2014 |
| WO | 2008017925 A2 | 2/2008 |

OTHER PUBLICATIONS

Robert L. Stephont et al. (1992), Synthesis of 4-trans-[1-[4-[2-(5-Chloro-2-Methoxybenzamido)Ethyl]Benzenesulfonyl]Ureido]Cyclohexanol Hemisuccinate Ester, Organic Preparations and Procedures International, The New Journal for Organic Synthesis, vol. 24, No. 3, pp. 339-342, DOI: 10.1080/00304949209355897 (6 pages).

Zachary A. King et al., Profile of intravenous glyburide for the prevention of cerebral edema following large hemispheric infarction: evidence to date, Drug Design, Development and Therapy, 2018, vol. 12, pp. 2539-2552 (14 pages).

Vincenzo Calderone et al., NO-glibenclamide derivatives: Prototypes of a new class of nitric oxide-releasing anti-diabetic drugs, Bioorganic & Medicinal Chemistry, vol. 17, Issue 15, 2009, pp. 5426-5432, ISSN 0968-0896, https://doi.org/10.1016/j.bmc.2009.06.049 (7 pages).

*Primary Examiner* — Joseph K Mckane
*Assistant Examiner* — Sagar Patel
(74) *Attorney, Agent, or Firm* — Morgan, Lewis & Bockius LLP

(57) ABSTRACT

The present invention relates to a sulfonylurea derivative and medical uses thereof, specifically relating to the sulfonylurea derivative shown in general formula (I), a preparation method thereof, a pharmaceutical composition containing same, and a use of same for treating diseases and disorders affected by neuronal damage, for example: cerebral stroke, brain damage, neuropathic pain, migraines, inflammatory pain, chronic pain, or depression. The definition of each group in the general formula (I) is the same as that in the description.

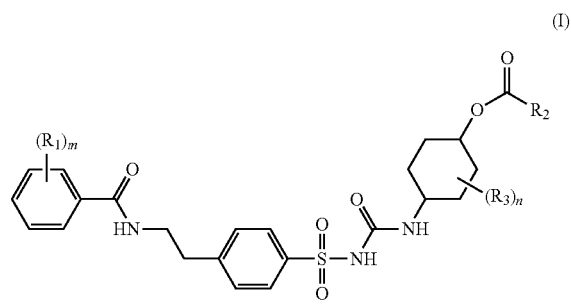

(I)

18 Claims, 2 Drawing Sheets

SULFONYLUREA DERIVATIVE AND MEDICAL USES THEREOF

CROSS-REFERENCE TO RELATED APPLICATIONS

The present application is a national stage application of International Patent Application No. PCT/CN2021/106746, filed Jul. 16, 2021, which claims the benefit of and priority to Chinese Patent Application No. 202010690191.4 filed on Jul. 17, 2020, each of which is incorporated herein by reference in their entirety.

TECHNICAL FIELD

The present disclosure relates to the field of pharmaceutics, and particularly relates to a sulfonylurea derivative, a preparation method therefor and use thereof as a medicament.

BACKGROUND

Cerebral stroke, also known as "stoke" or "cerebrovascular accident (CVA)", is an acute cerebrovascular disease. It is a group of diseases that cause damage to brain tissue due to sudden rupture of cerebral vessels or failure of blood to flow into the brain due to vascular obstruction, and includes ischemic stroke and hemorrhagic stroke. The ischemic stroke has a higher incidence rate than the hemorrhagic stroke, and accounts for 60%-70% of the total number of cerebral stroke cases. Occlusion and stenosis of the internal carotid and vertebral arteries can cause ischemic stroke, which is more common in patients over 40 years old and is more common in males than in females, and can cause death in severe cases. The hemorrhagic stroke has a higher fatality rate. According to relevant surveys, cerebral stroke, the number of whose cases in both urban and rural areas was totaled, has become the first cause of death in China and the leading cause of disability in Chinese adults. The cerebral stroke is characterized by high incidence rate, high fatality rate and high disability rate.

The most common cause of cerebral stroke is a small embolus present on the inner wall of a blood supplying vessel to the brain, which falls off and causes an arterial embolism, also known as an ischemic stroke. It may also be caused by cerebrovascular or thrombotic hemorrhage, which is hemorrhagic stroke. The heart valve of a patient with coronary heart disease accompanied by atrial fibrillation is prone to mural thrombus, and the thrombus can block cerebral vessels or even lead to ischemic stroke after falling off. Other causative factors include hypertension, diabetes, hyperlipidemia and the like.

In 2018, the biopharmaceutical company Biogen evaluated the Phase III clinical study of BIIB093 (intravenous glibenclamide) for the prevention and treatment of severe cerebral edema in patients with large hemispheric infarction (LHI) (CN103108637B). LHI is one of the most severe types of stroke, with approximately 15% of the estimated 1.7 million ischemic stroke cases occurring each year in the three major pharmaceutical markets of the United States, the European Union, and Japan, classified as LHI. Glibenclamide is a sulfonylurea hypoglycemic agent that acts on the ATP-sensitive potassium channels of β cells to directly stimulate insulin secretion from pancreatic β cells, with strong hypoglycemic effects, and is one of the most widely used oral hypoglycemic agent categories in clinical practice. BIIB093 is a high affinity inhibitor of the SUR1-TRPM4 (sulfonylurea receptor 1-transient receptor potential cation channel subfamily M member 4) channel, which is upregulated after ischemia and trauma, and the opening of these channels can lead to cerebral edema, midline shift, increased intracranial pressure and cerebral hernia resulting in permanent disability or death (*Drug Des Devel Ther.* 2018, 15, 2539-2552). BIIB093 is an experimental drug that is currently being developed for the prevention and treatment of severe cerebral edema caused by LHI.

The present disclosure aims to provide a sulfonylurea derivative which has high brain penetration rate and is capable of generating inhibitory or therapeutic effect on central nervous system diseases such as cerebral stroke.

SUMMARY

The present disclosure provides a compound of general formula (I) or a pharmaceutically acceptable salt or isomer thereof,

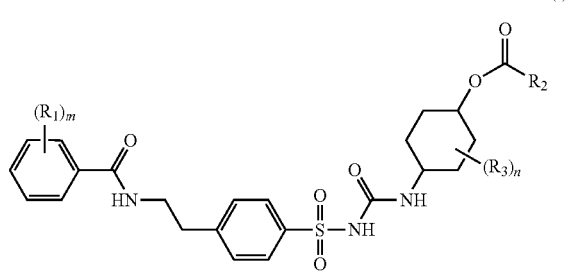

(I)

wherein, $R_1$ are each independently selected from the group consisting of deuterium, alkyl optionally substituted with halogen, halogen, hydroxy, mercapto, —$NR_iR_j$, —$C(O)R_k$, —$C(O)OR_k$, nitro, cyano, alkoxy optionally substituted with halogen, and alkylthio;

$R_2$ is selected from the group consisting of alkyl, alkoxy, alkenyl, alkynyl, aryl, heteroaryl, cycloalkyl and heterocyclyl, wherein the alkyl, alkoxy, alkenyl, alkynyl, aryl, heteroaryl, cycloalkyl and heterocyclyl are optionally further substituted with one or more groups selected from the group consisting of deuterium, alkyl, haloalkyl, halogen, hydroxy, oxo, mercapto, —$NR_iR_j$, —$C(O)R_k$, —$C(O)OR_k$, —$SR_i$, —$S(O)R_i$, —$SO_2R_i$, nitro, cyano, aryl optionally substituted with hydroxy or alkoxy, heteroaryl optionally substituted with oxo or alkyl, heterocyclyl optionally substituted with oxo or alkyl, cycloalkyl optionally substituted with oxo or alkyl, optionally substituted alkenyl, optionally substituted alkynyl, alkoxy, and alkylthio;

$R_3$ are each independently selected from the group consisting of deuterium, alkyl optionally substituted with halogen, halogen, hydroxy, mercapto, —$NR_iR_j$, —$C(O)R_k$, —$C(O)OR_k$, nitro, cyano, alkoxy, and alkylthio;

$R_i$ and $R_j$ are each independently selected from the group consisting of hydrogen, hydroxy, alkyl, cycloalkyl, alkoxy, and —$C(=NH)—NH_2$;

$R_k$ is selected from the group consisting of alkyl, alkoxy, aryl, alkenyl and alkynyl, wherein the alkyl, alkoxy, aryl, alkenyl and alkynyl are optionally further substituted with one or more groups selected from the group consisting of aryl, heteroaryl, heterocyclyl, cycloalkyl, alkyl and alkoxy;

m is an integer selected from the group consisting of 0 to 5;

n is an integer selected from the group consisting of 0 to 10; and $R_2$ is not

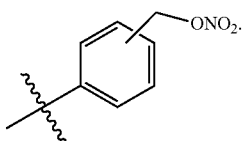

In some embodiments, in the compound of formula (I), $R_1$ are each independently selected from the group consisting of deuterium, $C_{1-6}$ alkyl optionally substituted with halogen, halogen, hydroxy, mercapto, —$NR_iR_j$, —$C(O)R_k$, —$C(O)OR_k$, nitro, cyano, $C_{1-6}$ alkoxy, and $C_{1-6}$ alkylthio;

$R_2$ is selected from the group consisting of $C_{1-20}$ alkyl, $C_{1-20}$ alkoxy, $C_{2-12}$ alkenyl, $C_{2-12}$ alkynyl, 6- to 14-membered aryl, 5- to 14-membered heteroaryl, 3- to 15-membered cycloalkyl, and 3- to 20-membered heterocyclyl, wherein:

the $C_{1-20}$ alkyl is preferably $C_{1-12}$ alkyl, and more preferably $C_{1-6}$ alkyl, the $C_{1-20}$ alkoxy is preferably $C_{1-12}$ alkoxy, and more preferably $C_{1-6}$ alkoxy, the $C_{2-12}$ alkenyl is preferably $C_{2-6}$ alkenyl, the 6- to 14-membered aryl is preferably 6- to 12-membered aryl, and more preferably phenyl or naphthyl, the 5- to 14-membered heteroaryl is preferably 6- to 12-membered heteroaryl, and more preferably 5- or 6-membered heteroaryl, the 3- to 15-membered cycloalkyl is preferably 3- to 10-membered cycloalkyl, and more preferably 5- to 7-membered cycloalkyl, the 3- to 20-membered heterocyclyl is preferably 3- to 12-membered heterocyclyl, and more preferably 3- to 8-membered heterocyclyl, and the $C_{1-20}$ alkyl, $C_{1-20}$ alkoxy, $C_{2-12}$ alkenyl, $C_{2-12}$ alkynyl, 6- to 14-membered aryl, 5- to 14-membered heteroaryl, 3- to 15-membered cycloalkyl, and 3- to 20-membered heterocyclyl are optionally further substituted with one or more groups selected from the group consisting of deuterium, alkyl, haloalkyl, halogen, hydroxy, oxo, mercapto, —$NR_iR_j$, —$C(O)R_k$, —$C(O)OR_k$, —$SR_i$, —$S(O)R_i$, —$SO_2R_i$, nitro, cyano, aryl optionally substituted with hydroxy or alkoxy, heteroaryl optionally substituted with oxo or alkyl, heterocyclyl optionally substituted with oxo or alkyl, cycloalkyl optionally substituted with oxo or alkyl, optionally substituted alkenyl, optionally substituted alkynyl, alkoxy and alkylthio;

$R_3$ are each independently selected from the group consisting of deuterium, $C_{1-6}$ alkyl optionally substituted with halogen, halogen, hydroxy, mercapto, —$NR_iR_j$, —$C(O)R_k$, —$C(O)OR_k$, nitro, cyano, $C_{1-6}$ alkoxy, and $C_{1-6}$ alkylthio;

$R_i$ and $R_j$ are each independently selected from the group consisting of hydrogen, hydroxy, alkyl, cycloalkyl, alkoxy, and —$C(=NH)$—$NH_2$;

$R_k$ is selected from the group consisting of alkyl, alkoxy, aryl, alkenyl and alkynyl, wherein the alkyl, alkoxy, aryl, alkenyl and alkynyl are optionally further substituted with one or more groups selected from the group consisting of aryl, heteroaryl, heterocyclyl, cycloalkyl, alkyl and alkoxy;

m is an integer selected from the group consisting of 0 to 5;

n is an integer selected from the group consisting of 0 to 10; and $R_2$ is not

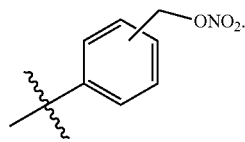

In some embodiments, in the compound of formula (I), $R_1$ is selected from the group consisting of halogen, $C_{1-6}$ alkoxy, $C_{1-6}$ alkyl optionally substituted with halogen, and cyano, and $R_2$, $R_3$, m and n are as defined above.

In some embodiments, in the compound of formula (I), $R_1$ is selected from the group consisting of Cl, $OCH_3$, $OCD_3$, CN, OH and $OCF_3$, and $R_2$, $R_3$, m and n are as defined above.

In some embodiments, in the compound of formula (I), $R_1$ are each independently selected from the group consisting of deuterium, $C_{1-6}$ alkyl optionally substituted with halogen, halogen, hydroxy, mercapto, —$NR_iR_j$, —$C(O)R_k$, —$C(O)OR_k$, nitro, cyano, $C_{1-6}$ alkoxy, and $C_{1-6}$ alkylthio;

$R_2$ is selected from the group consisting of $C_1$-$C_6$ alkyl, $C_2$-$C_6$ alkenyl, and $C_6$-$C_{10}$ aryl, wherein:

the alkyl is optionally substituted with $C_6$-$C_{10}$ aryl or —$NR_iR_j$, wherein $R_i$ and $R_j$ may be independently selected from the group consisting of hydrogen and —$C(=NH)$—$NH_2$;

the $C_6$-$C_{10}$ aryl is optionally substituted with hydroxy and/or $C_1$-$C_6$ alkoxy, or the aryl is optionally substituted with 5- to 7-membered heterocyclyl, wherein the 5- to 7-membered heterocyclyl is optionally substituted with oxo and/or $C_1$-$C_6$ alkyl; and the $C_2$-$C_6$ alkenyl is optionally substituted with $C_6$-$C_{10}$ aryl, wherein the $C_6$-$C_{10}$ aryl is optionally substituted with hydroxy and/or $C_1$-$C_6$ alkoxy;

$R_3$ are each independently selected from the group consisting of deuterium, $C_{1-6}$ alkyl optionally substituted with halogen, halogen, hydroxy, mercapto, —$NR_iR_j$, —$C(O)R_k$, —$C(O)OR_k$, nitro, cyano, $C_{1-6}$ alkoxy, and alkylthio;

$R_i$ and $R_j$ may be independently selected from the group consisting of hydrogen, hydroxy, alkyl, cycloalkyl, alkoxy and —$C(=NH)$—$NH_2$;

$R_k$ is selected from the group consisting of alkyl, alkoxy, aryl, alkenyl and alkynyl, wherein the alkyl, alkoxy, aryl, alkenyl and alkynyl may be further substituted with aryl, heteroaryl, heterocyclyl, cycloalkyl, alkyl and alkoxy;

m is an integer selected from the group consisting of 0 to 5; and n is an integer selected from the group consisting of 0 to 10.

In some embodiments, in the compound of formula (I), $R_1$ is selected from the group consisting of halogen, $C_{1-6}$ alkoxy, $C_{1-6}$ alkyl optionally substituted with halogen, and cyano, $R_2$ is selected from the group consisting of $C_{1-6}$ alkyl, $C_2$-$C_6$ alkenyl, and $C_6$-$C_{10}$ aryl, wherein: the alkyl is optionally substituted with aryl or —$NR_iR_j$, wherein $R_i$ and $R_j$ may be independently selected from the group consisting of hydrogen and —C(=NH)—$NH_2$, and the aryl is optionally substituted with hydroxy and/or alkoxy, the alkenyl is optionally substituted with aryl, wherein the aryl is optionally substituted with hydroxy and/or alkoxy, and the aryl is optionally substituted with heterocyclyl, wherein the heterocyclyl is optionally substituted with oxo and/or alkyl;

n is 0; and m is an integer selected from the group consisting of 0 to 5.

In some embodiments, in the compound of formula (I), $R_1$ are each independently selected from the group consisting of deuterium, alkyl optionally substituted with halogen, halogen, hydroxy, mercapto, —$NR_iR_j$, —C(O)$R_k$, —C(O)O$R_k$, nitro, cyano, alkoxy, and alkylthio;

$R_3$ are each independently selected from the group consisting of deuterium, alkyl optionally substituted with halogen, halogen, hydroxy, mercapto, —$NR_iR_j$, —C(O)$R_k$, —C(O)O$R_k$, nitro, cyano, alkoxy, and alkylthio;

$R_i$ and $R_j$ may be independently selected from the group consisting of hydrogen, hydroxy, alkyl, cycloalkyl, alkoxy and —C(=NH)—$NH_2$;

$R_k$ is selected from the group consisting of alkyl, alkoxy, aryl, alkenyl and alkynyl, wherein the alkyl, alkoxy, aryl, alkenyl and alkynyl may be further substituted with aryl, heteroaryl, heterocyclyl, cycloalkyl, alkyl and alkoxy;

m is an integer selected from the group consisting of 0 to 5;

n is an integer selected from the group consisting of 0 to 10; and $R_2$ is selected from the group consisting of

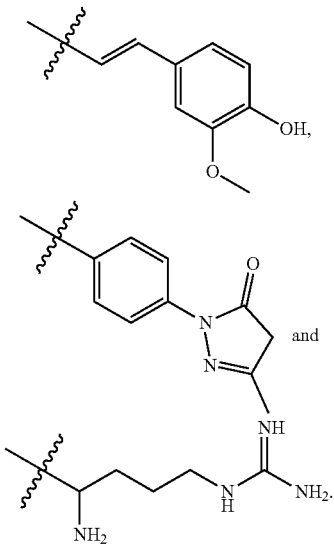

In some embodiments, in the compound of formula (I), n is 0;

$R_1$ are each independently selected from the group consisting of deuterium, alkyl optionally substituted with halogen, halogen, hydroxy, mercapto, —$NR_iR_j$, —C(O)$R_k$, —C(O)O$R_k$, nitro, cyano, alkoxy, and alkylthio;

$R_2$ is selected from the group consisting of alkyl, alkoxy, alkenyl, alkynyl, aryl, heteroaryl, cycloalkyl and heterocyclyl, wherein the alkyl, alkoxy, alkenyl, alkynyl, aryl, heteroaryl, cycloalkyl and heterocyclyl are optionally further substituted with one or more groups selected from the group consisting of deuterium, alkyl, haloalkyl, halogen, hydroxy, oxo, mercapto, —$NR_iR_j$, —C(O)$R_k$, —C(O)O$R_k$, —$SR_i$, —S(O)$R_i$, —$SO_2R_i$, nitro, cyano, aryl optionally substituted with hydroxy or alkoxy, heteroaryl optionally substituted with oxo or alkyl, heterocyclyl optionally substituted with oxo or alkyl, cycloalkyl optionally substituted with oxo or alkyl, optionally substituted alkenyl, optionally substituted alkynyl, alkoxy, and alkylthio;

$R_i$ and $R_j$ may be independently selected from the group consisting of hydrogen, hydroxy, alkyl, cycloalkyl, alkoxy and —C(=NH)—$NH_2$;

$R_k$ is selected from the group consisting of alkyl, alkoxy, aryl, alkenyl and alkynyl, wherein the alkyl, alkoxy, aryl, alkenyl and alkynyl may be optionally further substituted with one or more groups selected from the group consisting of aryl, heteroaryl, heterocyclyl, cycloalkyl, alkyl and alkoxy;

m is an integer selected from the group consisting of 0 to 5; and $R_2$ is not

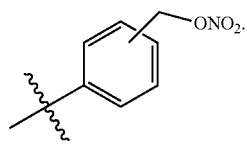

In some embodiments, in the compound of formula (I), n is 0;

$R_1$ is selected from the group consisting of halogen, alkoxy, alkyl optionally substituted with halogen, and cyano;

$R_2$ is selected from the group consisting of alkyl, alkoxy, alkenyl, alkynyl, aryl, heteroaryl, cycloalkyl and heterocyclyl, wherein the alkyl, alkoxy, alkenyl, alkynyl, aryl, heteroaryl, cycloalkyl and heterocyclyl are optionally further substituted with one or more groups selected from the group consisting of deuterium, alkyl, haloalkyl, halogen, hydroxy, oxo, mercapto, —$NR_iR_j$, —C(O)$R_k$, —C(O)O$R_k$, —$SR_i$, —S(O)$R_i$, —$SO_2R_i$, nitro, cyano, aryl optionally substituted with hydroxy or alkoxy, heteroaryl optionally substituted with oxo or alkyl, heterocyclyl optionally substituted with oxo or alkyl, cycloalkyl optionally substituted with oxo or alkyl, optionally substituted alkenylene, optionally substituted alkynylene, alkoxy, and alkylthio;

$R_i$ and $R_j$ may be independently selected from the group consisting of hydrogen, hydroxy, alkyl, cycloalkyl, alkoxy and —C(=NH)—$NH_2$;

$R_k$ is selected from the group consisting of alkyl, alkoxy, aryl, alkenyl and alkynyl, wherein the alkyl, alkoxy, aryl, alkenyl and alkynyl may be optionally further substituted with one or more groups selected from the group consisting of aryl, heteroaryl, heterocyclyl, cycloalkyl, alkyl and alkoxy;

m is an integer selected from the group consisting of 0 to 5; and $R_2$ is not

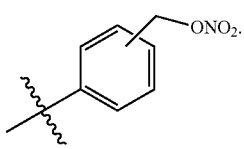

In some embodiments, in the compound of formula (I), n is 0;

$R_1$ is selected from the group consisting of Cl, $OCH_3$, CN, OH and $OCF_3$;

$R_2$ is selected from the group consisting of alkyl, alkoxy, alkenyl, alkynyl, aryl, heteroaryl, cycloalkyl and heterocyclyl, wherein the alkyl, alkoxy, alkenyl, alkynyl, aryl, heteroaryl, cycloalkyl and heterocyclyl are optionally further substituted with one or more groups selected from the group consisting of deuterium, alkyl, haloalkyl, halogen, hydroxy, oxo, mercapto, —$NR_iR_j$, —$C(O)R_k$, —$C(O)OR_k$, —$SR_i$, —$S(O)R_i$, —$SO_2R_i$, nitro, cyano, aryl optionally substituted with hydroxy or alkoxy, heteroaryl optionally substituted with oxo or alkyl, heterocyclyl optionally substituted with oxo or alkyl, cycloalkyl optionally substituted with oxo or alkyl, optionally substituted alkenylene, optionally substituted alkynylene, alkoxy, and alkylthio;

$R_i$ and $R_j$ may be independently selected from the group consisting of hydrogen, hydroxy, alkyl, cycloalkyl, alkoxy and —C(=NH)—$NH_2$;

$R_k$ is selected from the group consisting of alkyl, alkoxy, aryl, alkenyl and alkynyl, wherein the alkyl, alkoxy, aryl, alkenyl and alkynyl may be further substituted with aryl, heteroaryl, heterocyclyl, cycloalkyl, alkyl and alkoxy;

m is an integer selected from the group consisting of 0 to 5; and $R_2$ is not

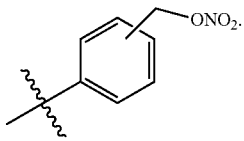

In some embodiments, in the compound of formula (I), n is 0;

$R_1$ are each independently selected from the group consisting of deuterium, alkyl optionally substituted with halogen, halogen, hydroxy, mercapto, —$NR_iR_j$, —$C(O)R_k$, —$C(O)OR_k$, nitro, cyano, alkoxy, and alkylthio;

$R_2$ is selected from the group consisting of

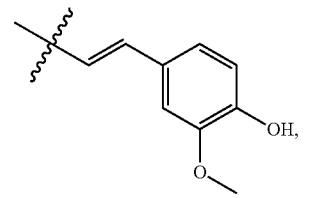

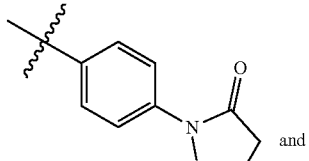

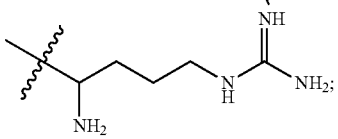

$R_i$ and $R_j$ may be independently selected from the group consisting of hydrogen, hydroxy, alkyl, cycloalkyl, alkoxy and —C(=NH)—$NH_2$;

$R_k$ is selected from the group consisting of alkyl, alkoxy, aryl, alkenyl and alkynyl, wherein the alkyl, alkoxy, aryl, alkenyl and alkynyl may be optionally further substituted with one or more groups selected from the group consisting of aryl, heteroaryl, heterocyclyl, cycloalkyl, alkyl and alkoxy; and m is an integer selected from the group consisting of 0 to 5.

In some embodiments, in the compound of formula (I), $R_1$ is selected from the group consisting of halogen, alkoxy, alkyl optionally substituted with halogen, and cyano;

$R_2$ is selected from the group consisting of

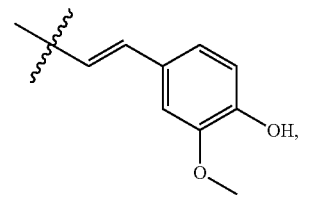

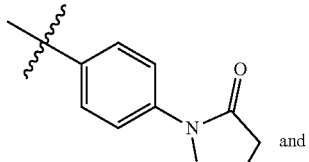

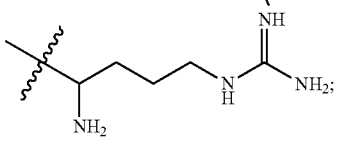

n is 0; and m is an integer selected from the group consisting of 0 to 5.

In some embodiments, in the compound of formula (I), $R_1$ is selected from the group consisting of Cl, $OCH_3$, CN, OH and $OCF_3$;

$R_2$ is selected from the group consisting of

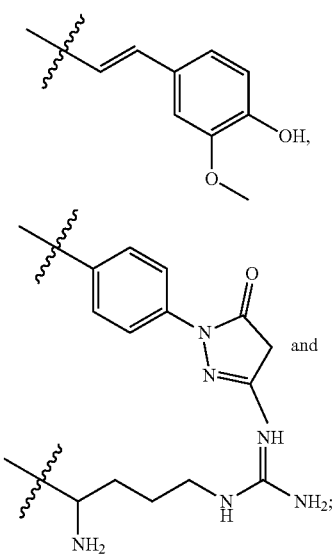

n is 0; and m is an integer selected from the group consisting of 0 to 5.

Provided is a compound of formula (I-1) or a pharmaceutically acceptable salt or isomer thereof,

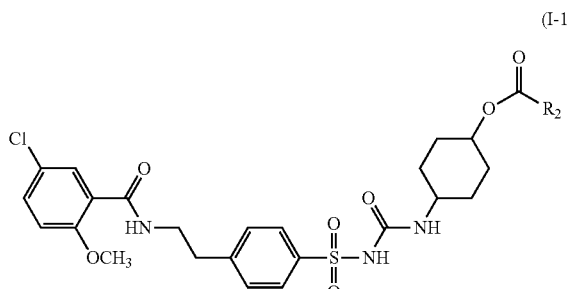

(I-1)

wherein, $R_2$ is selected from the group consisting of alkyl, alkoxy, alkenyl, alkynyl, aryl, heteroaryl, cycloalkyl and heterocyclyl, wherein the alkyl, alkoxy, alkenyl, alkynyl, aryl, heteroaryl, cycloalkyl and heterocyclyl are optionally further substituted with one or more groups selected from the group consisting of deuterium, alkyl, haloalkyl, halogen, hydroxy, oxo, mercapto, $-NR_iR_j$, $-C(O)R_k$, $-C(O)OR_k$, $-SR_i$, $-S(O)R_i$, $-SO_2R_i$, nitro, cyano, aryl optionally substituted with hydroxy and/or alkoxy, heteroaryl optionally substituted with oxo and/or alkyl, heterocyclyl optionally substituted with oxo and/or alkyl, cycloalkyl optionally substituted with oxo and/or alkyl, optionally substituted alkenylene, optionally substituted alkynylene, alkoxy, and alkylthio;

$R_i$ and $R_j$ may be independently selected from the group consisting of hydrogen, hydroxy, alkyl, cycloalkyl, alkoxy and $-C(=NH)-NH_2$;

$R_k$ is selected from the group consisting of alkyl, alkoxy, aryl, alkenyl and alkynyl, wherein the alkyl, alkoxy, aryl, alkenyl and alkynyl may be optionally further substituted with one or more groups selected from the group consisting of aryl, heteroaryl, heterocyclyl, cycloalkyl, alkyl and alkoxy; and $R_2$ is not

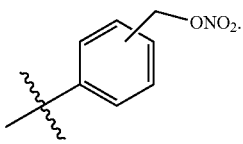

In some embodiments, in the compound of formula (I-1), $R_2$ is selected from the group consisting of alkyl, alkenyl and aryl, wherein:

the alkyl is optionally substituted with aryl or $-NR_iR_j$, wherein $R_i$ and $R_j$ may be independently selected from the group consisting of hydrogen and $-C(=NH)-NH_2$;

the aryl is optionally substituted with hydroxy and/or alkoxy; or the aryl is optionally substituted with heterocyclyl, wherein the heterocyclyl is optionally substituted with oxo and/or alky; and the alkenyl is optionally substituted with aryl, wherein the aryl is optionally substituted with hydroxy and/or alkoxy.

In some embodiments, in the compound of formula (I-1), $R_2$ is selected from the group consisting of $C_{1-20}$ alkyl, $C_{1-20}$ alkoxy, $C_{2-12}$ alkenyl, $C_{2-12}$ alkynyl, 6- to 14-membered aryl, 5- to 14-membered heteroaryl, 3- to 15-membered cycloalkyl, and 3- to 20-membered heterocyclyl, wherein:

the $C_{1-20}$ alkyl is preferably $C_{1-12}$ alkyl, and more preferably $C_{1-6}$ alkyl, the $C_{1-20}$ alkoxy is preferably $C_{1-12}$ alkoxy, and more preferably $C_{1-6}$ alkoxy, the $C_{2-12}$ alkenyl is preferably $C_{2-6}$ alkenyl, the 6- to 14-membered aryl is preferably 6- to 12-membered aryl, and more preferably phenyl or naphthyl, the 5- to 14-membered heteroaryl is preferably 6- to 12-membered heteroaryl, and more preferably 5- or 6-membered heteroaryl, the 3- to 15-membered cycloalkyl is preferably 3- to 10-membered cycloalkyl, and more preferably 5- to 7-membered cycloalkyl, the 3- to 20-membered heterocyclyl is preferably 3- to 12-membered heterocyclyl, and more preferably 3- to 8-membered heterocyclyl, and the $C_{1-20}$ alkyl, $C_{1-20}$ alkoxy, $C_{2-12}$ alkenyl, $C_{2-12}$ alkynyl, 6- to 14-membered aryl, 5- to 14-membered heteroaryl, 3- to 15-membered cycloalkyl, and 3- to 20-membered heterocyclyl are optionally further substituted with one or more groups selected from the group consisting of deuterium, alkyl, haloalkyl, halogen, hydroxy, oxo, mercapto, $-NR_iR_j$, $-C(O)R_k$, $-C(O)OR_k$, $-SR_i$, $-S(O)R_i$, $-SO_2R_i$, nitro, cyano, aryl optionally substituted with hydroxy or alkoxy, heteroaryl optionally substituted with oxo or alkyl, heterocyclyl optionally substituted with oxo or alkyl, cycloalkyl optionally substituted with oxo or alkyl, optionally substituted alkenylene, optionally substituted alkynylene, alkoxy and alkylthio;

$R_i$ and $R_j$ may be independently selected from the group consisting of hydrogen, hydroxy, alkyl, cycloalkyl, alkoxy and —C(=NH)—NH$_2$;

$R_k$ is selected from the group consisting of alkyl, alkoxy, aryl, alkenyl and alkynyl, wherein the alkyl, alkoxy, aryl, alkenyl and alkynyl may be optionally further substituted with one or more groups selected from the group consisting of aryl, heteroaryl, heterocyclyl, cycloalkyl, alkyl and alkoxy; and $R_2$ is not

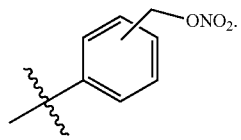

The present disclosure also provides a compound as shown below or a pharmaceutically acceptable salt or isomer thereof,

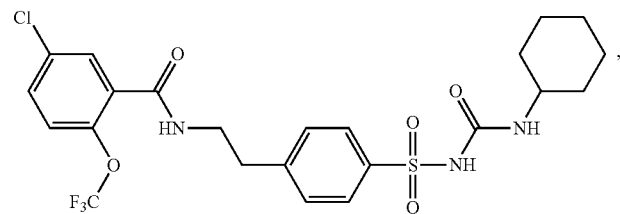

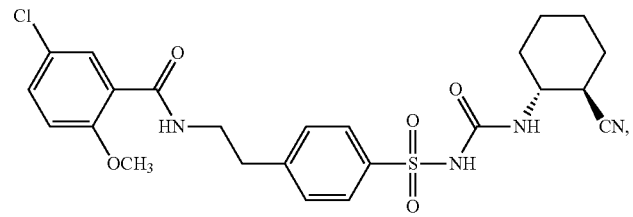

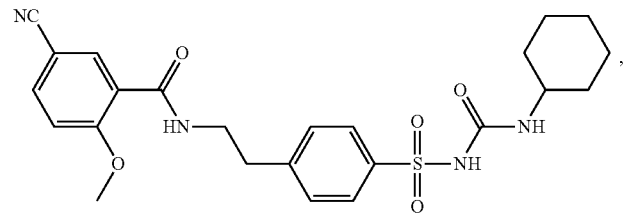

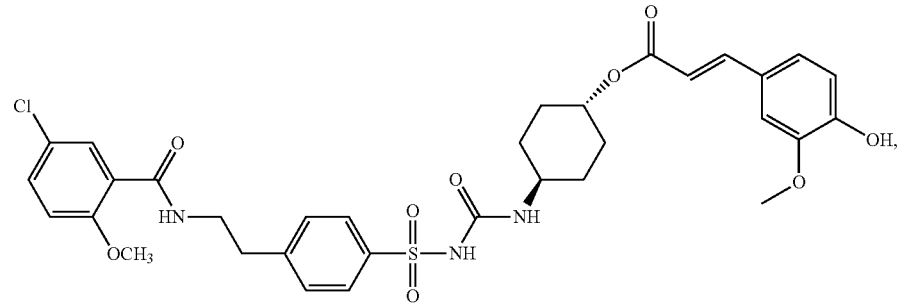

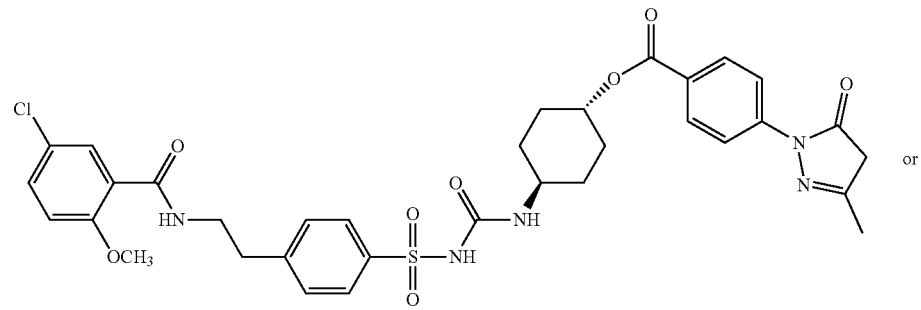

or

-continued

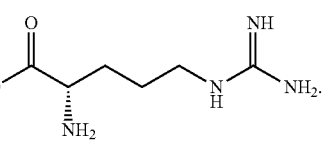
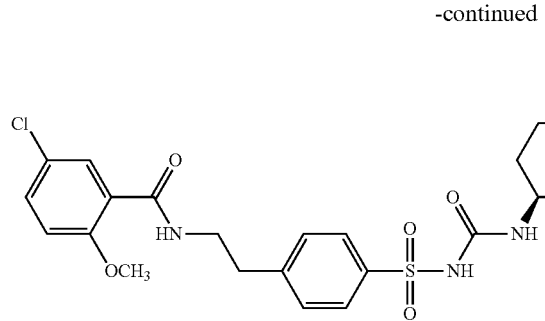

The present disclosure also provides use of a compound as shown below or a pharmaceutically acceptable salt or isomer thereof in preparing a medicament for the prevention or treatment of diseases and conditions affected by neuronal damage,

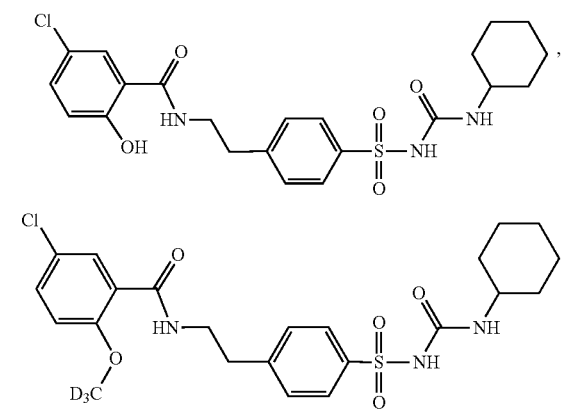

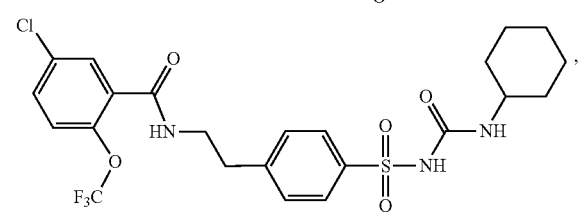

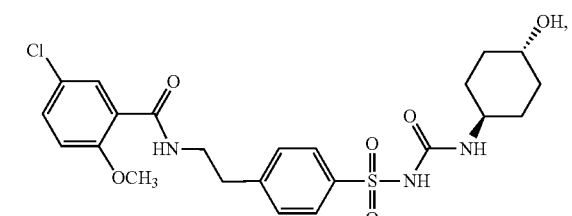

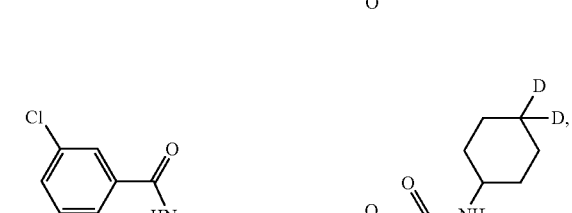

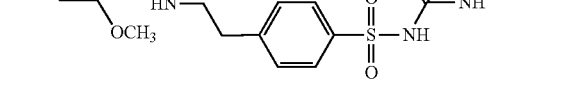

-continued

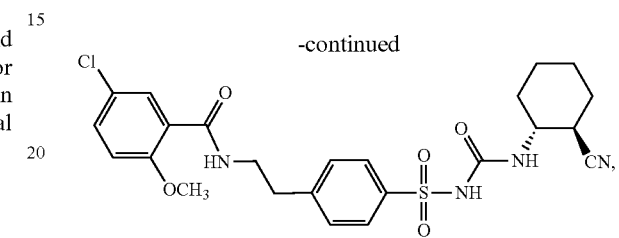

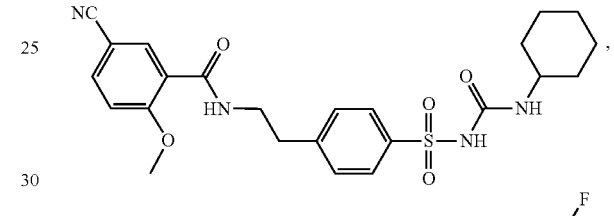

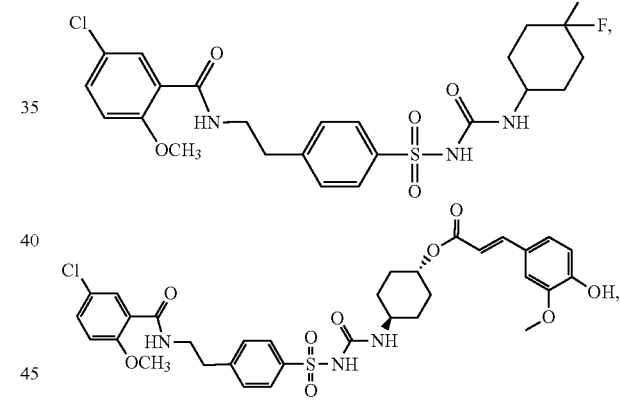

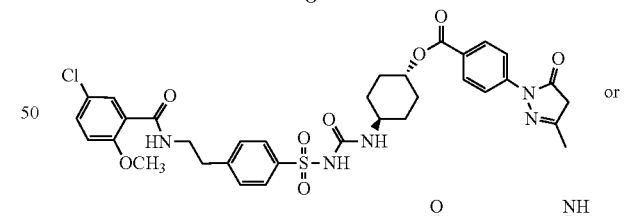

or

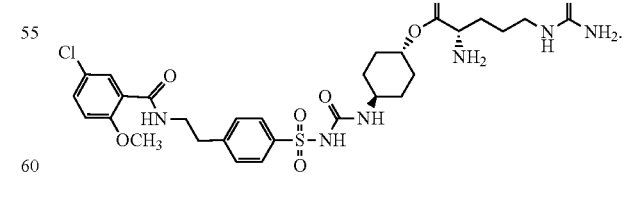

The present disclosure also provides use of a compound as shown below or a pharmaceutically acceptable salt or isomer thereof in the preparation of a medicament for treating acute stroke, traumatic brain injury, spinal cord injury, myocardial infarction, shock, organ ischemia, ventricular arrhythmia, ischemic injury, hypoxia/ischemia or other injury conditions and disorders in a patient,

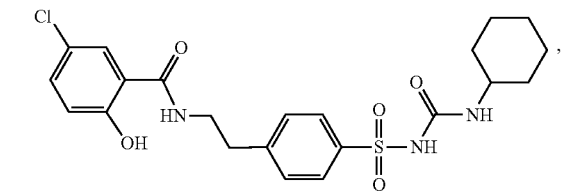

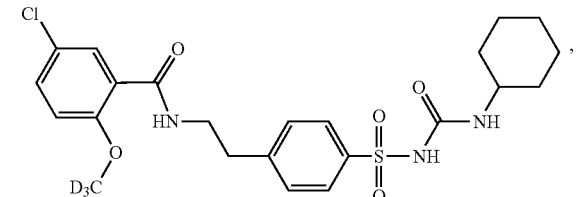

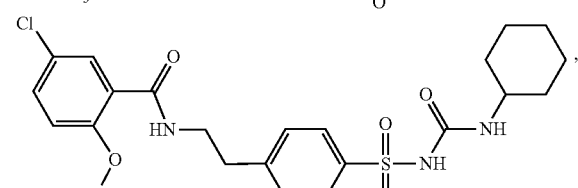

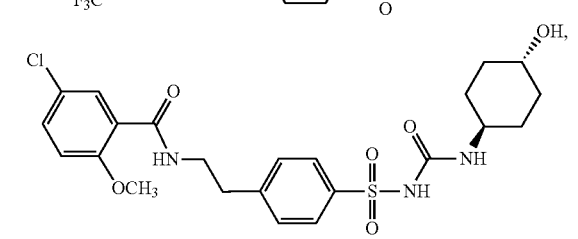

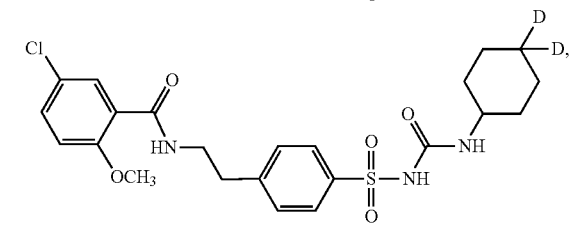

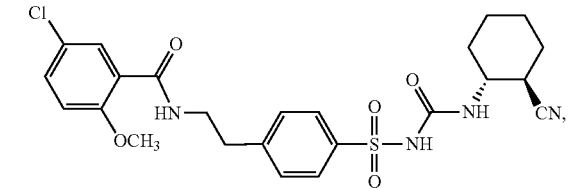

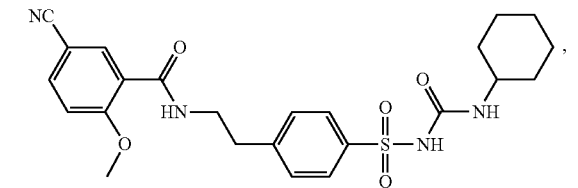

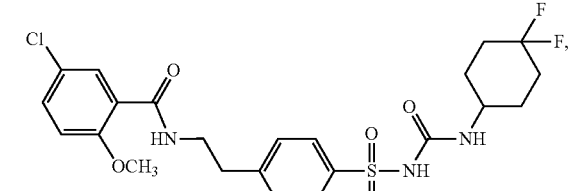

-continued

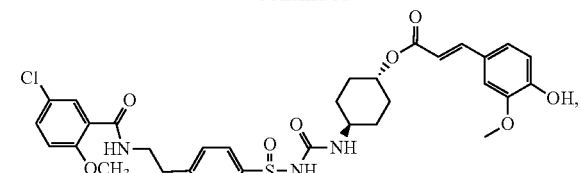

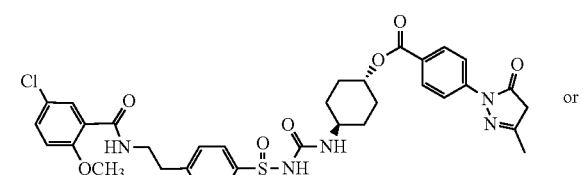

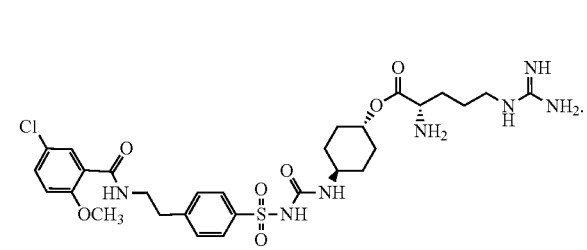

The present disclosure also provides a method for preparing a compound as shown below or a pharmaceutically acceptable salt thereof, which comprises:

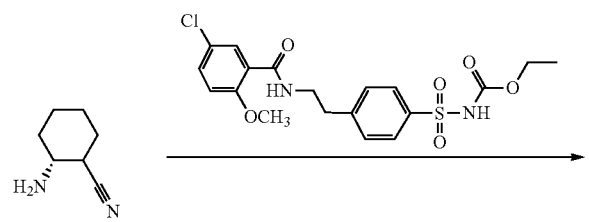

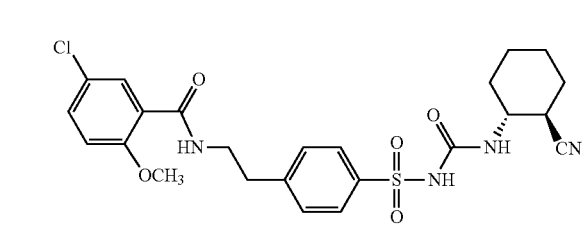

The present disclosure also provides a method for preparing a compound as shown below or a pharmaceutically acceptable salt thereof, which comprises:

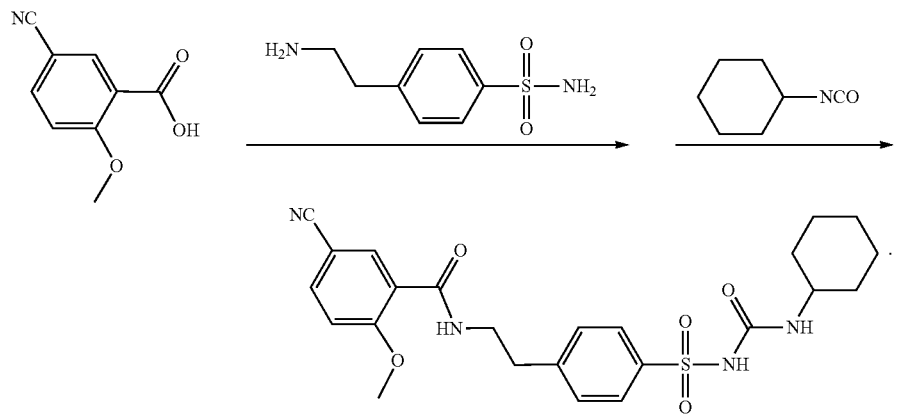

The present disclosure also provides a method for preparing a compound of formula (I-1) or a pharmaceutically acceptable salt or isomer thereof, which comprises:

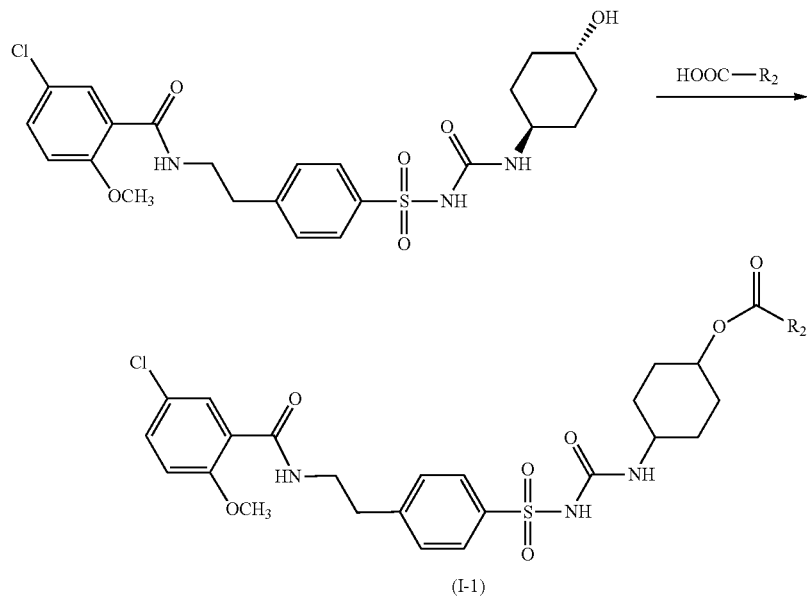

wherein $R_2$ is as defined in formula (I-1).

The present disclosure also relates to a pharmaceutical composition comprising the compound or the pharmaceutically acceptable salt or isomer thereof described herein. Generally, the composition also comprises at least one pharmaceutically acceptable carrier, diluent or excipient.

In certain embodiments, the pharmaceutical composition is in unit dose of 0.001-1000 mg.

In certain embodiments, the pharmaceutical composition comprises 0.01%-99.99% of the compound described above based on the total weight of the composition. In certain embodiments, the pharmaceutical composition comprises 0.1%-99.9% of the compound described above. In certain embodiments, the pharmaceutical composition comprises 0.5%-99.5% of the compound described above. In certain embodiments, the pharmaceutical composition comprises 1%-99% of the compound described above. In certain embodiments, the pharmaceutical composition comprises 2%-98% of the compound described above.

In certain embodiments, the pharmaceutical composition comprises 0.01%-99.99% of a pharmaceutically acceptable carrier, diluent or excipient based on the total weight of the composition. In certain embodiments, the pharmaceutical composition comprises 0.1%-99.9% of a pharmaceutically acceptable carrier, diluent or excipient. In certain embodiments, the pharmaceutical composition comprises 0.5%-99.5% of a pharmaceutically acceptable carrier, diluent or excipient. In certain embodiments, the pharmaceutical composition comprises 1%-99% of a pharmaceutically acceptable carrier, diluent or excipient. In certain embodiments, the pharmaceutical composition comprises 2%-98% of a pharmaceutically acceptable carrier, diluent or excipient.

The present disclosure also provides use of the compound or the pharmaceutically acceptable salt or isomer thereof, or the pharmaceutical composition comprising the same in the preparation of a medicament for preventing or treating diseases and conditions affected by neuronal damage.

In some embodiments, the diseases and conditions affected by neuronal damage are selected from the group consisting of stroke, brain injury, neuropathic pain, migraine, inflammatory pain, chronic pain and depression.

In some embodiments, the diseases and conditions affected by neuronal damage are ischemic stroke. In some embodiments, the diseases and conditions affected by neuronal damage are cerebral hemispheric infarction. In some embodiments, the diseases and conditions affected by neuronal damage are acute subarachnoid hemorrhage.

The present disclosure also provides use of the compound or the pharmaceutically acceptable salt or isomer thereof, or the pharmaceutical composition comprising the same in the preparation of a medicament for treating acute stroke, traumatic brain injury, spinal cord injury, myocardial infarction, shock, organ ischemia, ventricular arrhythmia, ischemic injury, hypoxia/ischemia, or other injury conditions and disorders in a patient.

The present disclosure also provides use of the compound or the pharmaceutically acceptable salt or isomer thereof, or the pharmaceutical composition comprising the same in the preparation of a medicament for treating central nervous system diseases such as cerebral stoke.

The compound of the present disclosure or the pharmaceutically acceptable salt or isomer thereof can be formulated in a dosage form suitable for oral, buccal, vaginal, rectal, inhalation, insufflation, intranasal, sublingual, topical, or parenteral (e.g., intramuscular, subcutaneous, intraperitoneal, intrathoracic, intravenous, epidural, intrathecal, intracerebroventricular, or by injection into the joints) administration.

The term "treatment" refers to the administration of a pharmaceutical composition for prophylactic and/or therapeutic purposes. By "preventing a disease" is meant prophylactically treating a subject who has not yet developed a disease but is susceptible to, or is at risk of developing, a specific disease. By "treating a disease" is meant treating a patient who is suffering from a disease to improve or stabilize the patient's condition.

Any isotopically-labeled (or radiolabeled) derivative of the compound or the pharmaceutically acceptable salt or isomer thereof described herein is encompassed by the present disclosure. Such derivatives are those in which one or more atoms are replaced with an atom whose atomic mass or mass number is different from that usually found in nature. Examples of radionuclides that may be incorporated include $^2$H (also written as "D", i.e., deuterium), $^3$H (also written as "T", i.e., tritium), $^{11}$C, $^{13}$C, $^{14}$C, $^{13}$N, $^{15}$N, $^{15}$O, $^{17}$O, $^{18}$O $^{18}$F, $^{36}$Cl, $^{82}$Br, $^{75}$Br, $^{76}$Br, $^{77}$Br, $^{123}$I, $^{124}$I, $^{125}$I, $^{31}$P, $^{32}$P, $^{35}$S, and $^{131}$I. The radionuclide used will depend on the particular application of the radiolabeled derivative. For example, for in vitro receptor labeling and competition assays, $^3$H or $^{14}$C is often useful. For radiographic application, $^{11}$C or $^{18}$F is often useful. In some embodiments, the radionuclide is $^3$H. In some embodiments, the radionuclide is $^{14}$C. In some embodiments, the radionuclide is $^{11}$C. Moreover, in some embodiments, the radionuclide is $^{18}$F.

Unless otherwise stated, the following terms used in the specification and claims have the following meanings.

The term "acceptable carrier, diluent or excipient" includes, but is not limited to, any adjuvant, carrier, excipient, glidant, sweetener, diluent, preservative, dye/colorant, flavoring agent, surfactant, wetting agent, dispersant, suspending agent, stabilizer, isotonic agent, solvent, or emulsifier that has been approved by the U.S. Food and Drug Administration for acceptable use in humans or livestock.

The term "alkyl" refers to a saturated aliphatic hydrocarbon group, including linear and branched groups of 1 to 20 carbon atoms, preferably alkyl having 1 to 12 carbon atoms, and more preferably alkyl having 1 to 6 carbon atoms. Non-limiting examples include methyl, ethyl, n-propyl, iso-propyl, n-butyl, isobutyl, tert-butyl, sec-butyl, n-pentyl, 1,1-dimethylpropyl, 1,2-dimethylpropyl, 2,2-dimethylpropyl, 1-ethylpropyl, 2-methylbutyl, 3-methylbutyl and various branched isomers thereof, and the like. The alkyl may be substituted or unsubstituted, and when it is substituted, the substitution with a substituent may be performed at any accessible connection site, wherein the substituent is preferably one or more of the following groups independently selected from the group consisting of aryl, heteroaryl and halogen.

The term "alkenyl" includes branched and linear alkenyl having 2 to 12 carbon atoms or alkenyl containing aliphatic hydrocarbon groups. For example, "$C_{2-6}$ alkenyl" refers to an alkenyl group having 2, 3, 4, 5 or 6 carbon atoms. Examples of alkenyl include, but are not limited to, ethenyl, allyl, 1-propenyl, 1-butenyl, 2-butenyl, 3-butenyl, 2-methylbut-2-enyl, 3-methylbut-1-enyl, 1-pentenyl, 3-pentenyl, and 4-hexenyl.

The term "alkynyl" includes branched and linear alkynyl having 2 to 12 carbon atoms or alkynyl containing aliphatic hydrocarbon groups, or alkynyl having a particular number of carbon atoms (if the particular number is specified), e.g., ethynyl, propynyl (e.g., 1-propynyl, 2-propynyl), 3-butynyl, pentynyl, hexynyl and 1-methylpent-2-ynyl.

The term "cycloalkyl" refers to a saturated or partially unsaturated monocyclic or polycyclic hydrocarbon substituent. The cycloalkyl ring contains 3 to 20 carbon atoms, preferably 3 to 12 carbon atoms, and more preferably 3 to 6 carbon atoms. Non-limiting examples of monocyclic cycloalkyl include cyclopropyl, cyclobutyl, cyclopentyl, cyclopentenyl, cyclohexyl, cyclohexenyl, cyclohexadienyl, cycloheptyl, cycloheptatrienyl, cyclooctyl, and the like. Polycyclic cycloalkyl includes spiro cycloalkyl, fused cycloalkyl, and bridged cycloalkyl. The cycloalkyl ring may be fused to an aryl, heteroaryl or heterocycloalkyl ring, wherein the ring attached to the parent structure is cycloalkyl. Non-limiting examples of cycloalkyl ring include indanyl, tetrahydronaphthyl, benzocycloheptyl, etc. The cycloalkyl may be optionally substituted or unsubstituted, and when it is substituted, the substituent is preferably one or more of groups independently selected from the group consisting of alkyl, alkenyl, alkynyl, alkoxy, alkylthio, alkylamino, halogen, mercapto, hydroxy, nitro, cyano, cycloalkyl, heterocycloalkyl, aryl, heteroaryl, cycloalkoxy, heterocycloalkoxy, cycloalkylthio, heterocycloalkylthio, oxo, carboxyl and a carboxylate group.

The term "heterocyclyl" refers to a saturated or partially unsaturated monocyclic or polycyclic hydrocarbon substituent containing 3 to 20 ring atoms, wherein one or more of the ring atoms are heteroatoms selected from the group consisting of nitrogen, oxygen and $S(O)_m$ (where m is an integer from 0 to 2), excluding a cyclic portion of —O—O—, —O—S— or —S—S—, and the remaining ring atoms are carbon atoms. The heterocyclyl preferably contains 3 to 12 ring atoms, of which 1 to 4 are heteroatoms; and more preferably contains 3 to 8 ring atoms. Non-limiting examples of monocyclic heterocyclyl include pyrrolidinyl, imidazolidinyl, tetrahydrofuranyl, tetrahydrothienyl, dihydroimidazolyl, dihydrofuranyl, dihydropyrazolyl, dihydropyrrolyl, piperidinyl, piperazinyl, morpholinyl, thiomorpholinyl, homopiperazinyl, etc. Polycyclic heterocyclyl includes spiro heterocyclyl, fused heterocyclyl, and bridged heterocyclyl. Non-limiting examples of "heterocyclyl" include:

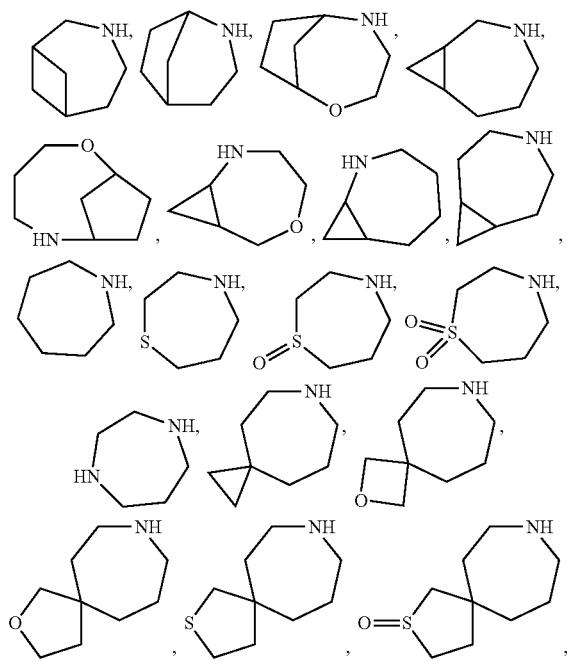

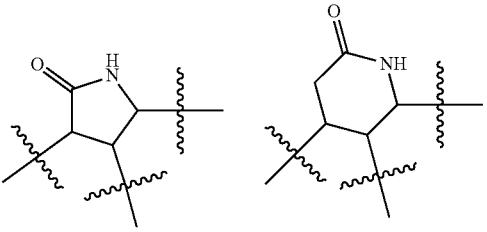

The heterocyclyl may be optionally substituted or unsubstituted, and when it is substituted, the substituent is preferably one or more of groups independently selected from the group consisting of alkyl, alkenyl, alkynyl, alkoxy, alkylthio, alkylamino, halogen, mercapto, hydroxy, nitro, cyano, cycloalkyl, heterocycloalkyl, aryl, heteroaryl, cycloalkoxy, heterocycloalkoxy, cycloalkylthio, heterocycloalkylthio, oxo, carboxyl and a carboxylate group.

The term "aryl" refers to a 6- to 14-membered, preferably 6- to 12-membered, carbon monocyclic or fused polycyclic (i.e., rings sharing a pair of adjacent carbon atoms) group having a conjugated π-electron system, such as phenyl and naphthyl. The aryl ring may be fused to a heteroaryl, heterocyclyl or cycloalkyl ring, wherein the ring connected to the parent structure is an aryl ring. Non-limiting examples of the aryl ring include:

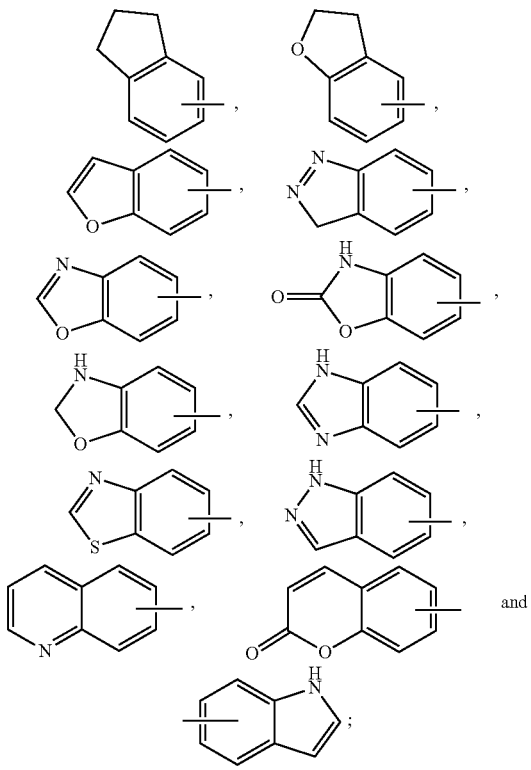

The heterocyclyl ring may be fused to an aryl, heteroaryl or cycloalkyl ring, wherein the ring connected to the parent structure is heterocyclyl. Non-limiting examples of the heterocyclyl ring include:

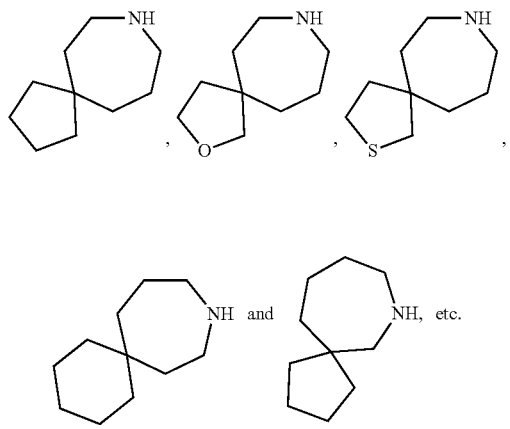

The ring carbon atoms of the heterocycloalkyl can be oxo (functionalized as a carbonyl group). Illustrative examples of such a heterocycloalkyl group are:

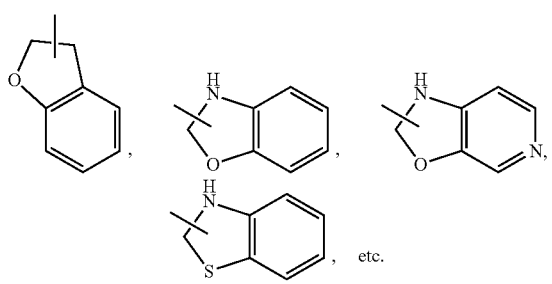

The aryl ring may be optionally substituted or unsubstituted, and when it is substituted, the substituent is preferably one or more of groups independently selected from the group consisting of alkyl, alkenyl, alkynyl, alkoxy, alkylthio, alkylamino, halogen, mercapto, hydroxy, nitro, cyano, cycloalkyl, heterocycloalkyl, aryl, heteroaryl, cycloalkoxy, heterocycloalkoxy, cycloalkylthio, heterocycloalkylthio, carboxyl and a carboxylate group, preferably phenyl.

The term "heteroaryl" refers to a heteroaromatic system containing 1 to 4 heteroatoms and 5 to 14 ring atoms, wherein the heteroatoms are selected from the group consisting of oxygen, sulfur and nitrogen. The heteroaryl is preferably 6- to 12-membered, more preferably 5- or 6-membered. For example. Non-limiting examples of heteroaryl include: imidazolyl, furyl, thienyl, thiazolyl, pyrazolyl, oxazolyl, pyrrolyl, tetrazolyl, pyridyl, pyrimidinyl, pyrazine, thiadiazole,

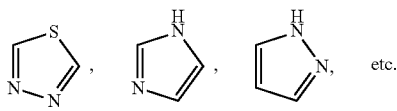

etc.

The heteroaryl ring may be fused to an aryl, heterocyclyl or cycloalkyl ring, wherein the ring linked to the parent structure is a heteroaryl ring. Non-limiting examples of the heteroaryl ring include:

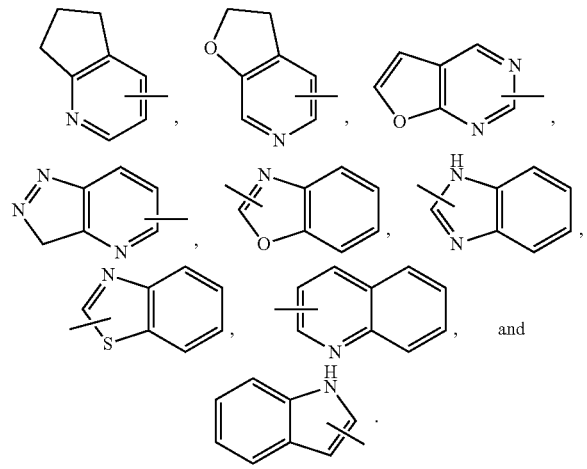

The fused heteroaryl may be optionally substituted or unsubstituted, and when it is substituted, the substituent is preferably one or more of groups independently selected from the group consisting of alkyl, alkenyl, alkynyl, alkoxy, alkylthio, alkylamino, oxo, halogen, mercapto, hydroxy, nitro, cyano, cycloalkyl, heterocycloalkyl, aryl, heteroaryl, cycloalkoxy, heterocycloalkoxy, cycloalkylthio, heterocycloalkylthio, carboxyl and a carboxylate group.

The term "alkoxy" refers to —O-(alkyl) and —O-(unsubstituted cycloalkyl), wherein the alkyl is as defined above. Non-limiting examples of alkoxy include: methoxy, ethoxy, propoxy, butoxy, cyclopropyloxy, cyclobutoxy, cyclopentyloxy and cyclohexyloxy. The alkoxy may be optionally substituted or unsubstituted, and when it is substituted, the substituent is preferably one or more of groups independently selected from the group consisting of alkyl, alkenyl, alkynyl, alkoxy, alkylthio, alkylamino, halogen, mercapto, hydroxy, nitro, cyano, cycloalkyl, heterocycloalkyl, aryl, heteroaryl, cycloalkoxy, heterocycloalkoxy, cycloalkylthio, heterocycloalkylthio, carboxyl and a carboxylate group.

The term "hydroxyalkyl" refers to an alkyl group substituted with hydroxy, wherein the alkyl is defined as above.

The term "haloalkyl" refers to an alkyl group substituted with halogen, wherein the alkyl group is as defined above.

The term "haloaryl" refers to an aryl group substituted with a halogen, where the aryl group is as defined above.

The term "haloheteroaryl" refers to a heteroaryl group substituted with halogen, wherein the heteroaryl group is as defined above.

The term "haloheterocyclyl" refers to a heterocyclyl group substituted with halogen, where the heterocyclyl group is as defined above.

The term "halocycloalkyl" refers to an cyclic group substituted with halogen, wherein the cycloalkyl group is as defined above.

The term "hydroxy" refers to an —OH group.

The term "mercapto" refers to an —SH group.

The term "alkylthio" refers to an —S-alkyl group, e.g., —S—CH$_3$, —S—CH$_2$—CH$_3$, and the like.

The term "halogen" refers to fluorine, chlorine, bromine or iodine.

The term "amino" refers to —NH$_2$.

The term "cyano" refers to —CN.

The term "nitro" refers to —NO$_2$.

The term "oxo" refers to an =O substituent.

The term "optionally" or "optional" means that the event or circumstance subsequently described may, but not necessarily, occur, and that the description includes instances where the event or circumstance occurs or does not occur. For example, "$C_1$-$C_6$ alkyl optionally substituted with halogen or cyano" means that halogen or cyano may, but not necessarily, be present, and the description includes the instance where alkyl is substituted with halogen or cyano and the instance where alkyl is not substituted with halogen and cyano.

The term "substituted" means that one or more, preferably up to 5, more preferably 1 to 3 hydrogen atoms in the group are independently substituted with a corresponding number of substituents. It goes without saying that a substituent is only in its possible chemical position, and those skilled in the art will be able to determine (experimentally or theoretically) possible or impossible substitution without undue efforts.

In the chemical structure of the compound described herein, a " ╱ " bond is not specified with a configuration, that is, a " ╱ " bond may be " ⸜⸜⸜ " or " ╱ ", or includes both " ⸜⸜⸜ " and " ╱ " configurations. In the chemical structure of the compound described herein, a " ⫽ " bond is not specified with a configuration, that is it may be in a Z configuration or an E configuration, or includes both configurations.

Although all of the above structural formulae are drawn as certain isomeric forms for the sake of simplicity, the present disclosure may include all isomers, such as tautomers, rotamers, geometric isomers, diastereomers, racemates and enantiomers.

Tautomers are structural isomers of organic compounds that readily interconvert by a chemical reaction called tautomerization. This reaction often results in the formal migration of hydrogen atoms or protons accompanied by the conversion of a single bond to an adjacent double bond. Some common tautomeric pairs include: keto-enol and lactam-lactim. An example of a lactam-lactim equilibrium is present between A and B as shown below.

All compounds in the present disclosure can be drawn as form A or form B. All tautomeric forms are within the scope of the present disclosure. The nomenclature of the compounds does not exclude any tautomers.

Any isotopically-labeled derivative of the compound or the pharmaceutically acceptable salt or isomer thereof described herein is encompassed by the present disclosure. Atoms that can be isotopically labeled include, but are not limited to, hydrogen, carbon, nitrogen, oxygen, phosphorus, fluorine, chlorine, iodine, etc. They may be separately replaced by the isotopes $^2$H (D), $^3$H, $^{11}$C, $^{13}$C, $^{14}$C, $^{15}$N, $^{18}$F, $^{31}$P, $^{32}$P, $^{35}$S, $^{36}$Cl and $^{125}$I, etc. Unless otherwise stated, when a position is specifically designated as deuterium (D), that position shall be understood to be deuterium having an abundance that is at least 3000 times greater than the natural abundance of deuterium (which is 0.015%) (i.e., incorporating at least 45% deuterium).

DETAILED DESCRIPTION

Figure 1:
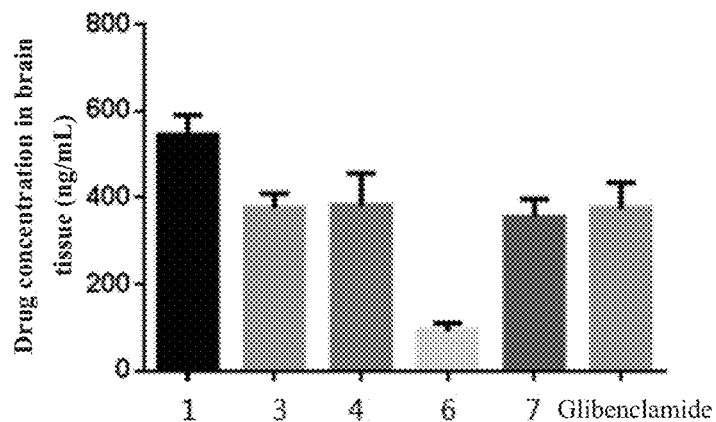
FIG. 1: concentration distribution of the compounds of the present disclosure in brain tissue 10 min after intravenous injection.
Figure 2:
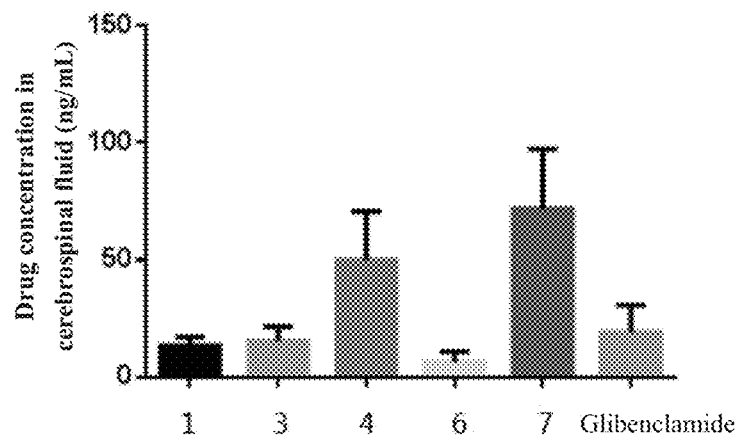
FIG. 2: concentration distribution of the compounds of the present disclosure in cerebrospinal fluid 10 min after intravenous injection.
Figure 3:
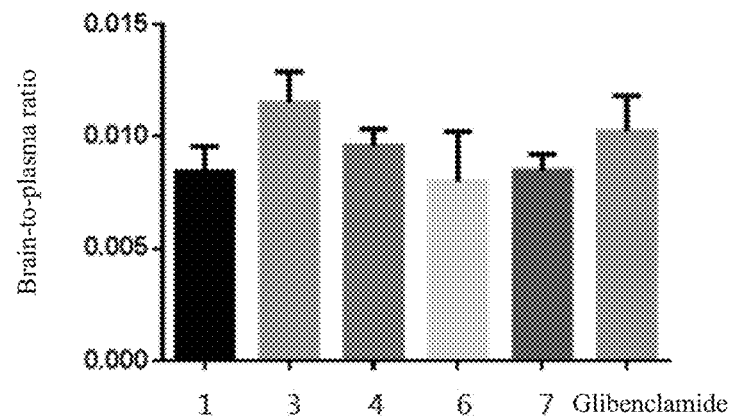
FIG. 3: brain-to-plasma ratio of the compounds of the present disclosure 10 min after intravenous injection.
Figure 4:
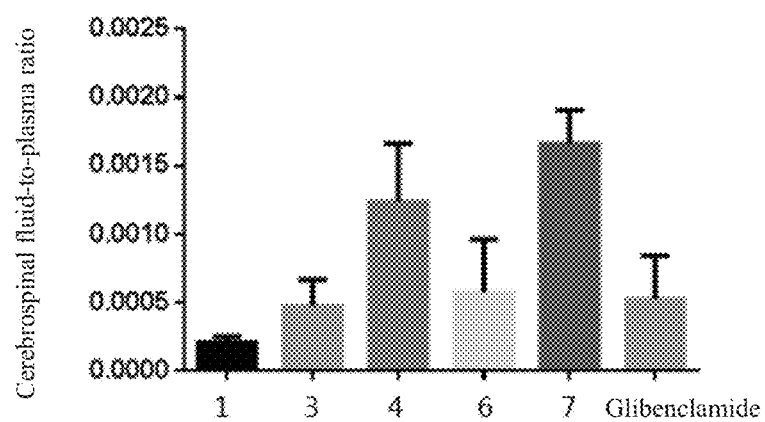
FIG. 4: cerebrospinal fluid-to-plasma ratio of the compounds of the present disclosure 10 min after intravenous injection.

The present disclosure is further described below with reference to examples, which are not intended to limit the scope of the present disclosure.

Experimental procedures without conditions specified in the examples of the present disclosure are generally conducted according to conventional conditions, or according to conditions recommended by the manufacturers of the starting materials or commercial products. Reagents without specific origins indicated are commercially available conventional reagents.

NMR shift (δ) is given in a unit of $10^{-6}$ (ppm). NMR spectra are determined using a Bruker AVANCE-400 nuclear magnetic resonance instrument, with deuterated dimethyl sulfoxide (DMSO-d$^6$), deuterated chloroform (CDCl$_3$) and deuterated methanol (CD$_3$OD) as determination solvents, and tetramethylsilane (TMS) as an internal standard.

MS spectra are determined using a Shimadzu 2010 Mass Spectrometer or Agilent 6110A MSD Mass Spectrometer.

High-Performance Liquid Chromatography (HPLC) analysis is performed using Shimadzu LC-20A systems, Shimadzu LC-2010HT series, or Agilent 1200 LC high-performance liquid chromatograph (Ultimate XB-C18 3.0× 150 mm chromatographic column or Xtimate C18 2.1×30 mm chromatographic column).

Chiral HPLC analysis is performed using the following chromatographic columns: Chiralpak IC-3 100×4.6 mm I.D., 3 μm, Chiralpak AD-3 150×4.6 mm I.D., 3 μm, Chiralpak AD-3 50×4.6 mm I.D., 3 μm, Chiralpak AS-3 150×4.6 mm I.D., 3 μm, Chiralpak AS-3 100×4.6 mm I.D., 3 μm, ChiralCel OD-3 150×4.6 mm I.D., 3 μm, Chiralcel OD-3 100×4.6 mm I.D., 3 μm, ChiralCel OJ-H 150×4.6 mm I.D., 5 μm, Chiralcel OJ-3 150×4.6 mm I.D., 3 μm.

Huanghai HSGF254 or Qingdao GF254 silica gel plates of specifications 0.15 mm to 0.2 mm are adopted for thin layer chromatography (TLC) analysis and 0.4 mm to 0.5 mm for TLC separation and purification.

Yantai Huanghai silica gel of 100-200 mesh, 200-300 mesh or 300-400 mesh is generally used as a carrier in column chromatography.

Chiral HPLC preparation is performed using a DAICEL CHIRALPAK IC (250×30 mm, 10 μm) or Phenomenex-Amylose-1 (250×30 mm, 5 μm) column.

A CombiFlash rapid preparation instrument used is Combiflash Rf150 (TELEDYNE ISCO).

The mean inhibition rate of kinase and the IC$_{50}$ value are determined using a NovoStar microplate reader (BMG, Germany).

Known starting materials described herein may be synthesized using or according to methods known in the art, or may be purchased from ABCR GmbH & Co. KG, Acros Organics, Aldrich Chemical Company, Accela ChemBio Inc., Chembee Chemicals, and other companies.

In the examples, the reactions can be performed in an argon atmosphere or a nitrogen atmosphere unless otherwise specified.

The argon atmosphere or nitrogen atmosphere means that the reaction flask is connected to a balloon containing about 1 L of argon or nitrogen.

The hydrogen atmosphere means that the reaction flask is connected to a balloon containing about 1 L of hydrogen.

Parr 3916EKX hydrogenator, Qinglan QL-500 hydrogenator or HC2-SS hydrogenator was used in the pressurized hydrogenation reactions.

The hydrogenation reactions usually involve 3 cycles of vacuumization and hydrogen purge.

A CEM Discover-S 908860 microwave reactor is used in the microwave reactions.

In the examples, a solution refers to an aqueous solution unless otherwise specified.

In the examples, the reaction temperature is room temperature, i.e., 20° C. to 30° C., unless otherwise specified.

The monitoring of the reaction progress in the examples is conducted by thin layer chromatography (TLC). The developing solvent for reactions, the eluent system of column chromatography for compound purification and the developing solvent system of thin layer chromatography include: A: dichloromethane/methanol system, B: n-hexane/ethyl acetate system, C: petroleum ether/ethyl acetate system, and D: petroleum ether/ethyl acetate/methanol system. The volume ratio of the solvents is adjusted according to the polarity of the compound, or by adding a small amount of basic or acidic reagents such as triethylamine and acetic acid.

The abbreviations used in the following experiments have the following meanings:

EtOAc: ethyl acetate; DCM: dichloromethane; DIPEA: N,N-diisopropylethylamine; PPTS: pyridinium p-toluenesulfonate; Boc: tert-butoxycarbonyl, MeOH: methanol.

Example 1: Preparation of 5-chloro-N-(4-(N-(cyclohexylcarbamoyl)sulfamoyl)phenethyl)-2-hydroxybenzamide

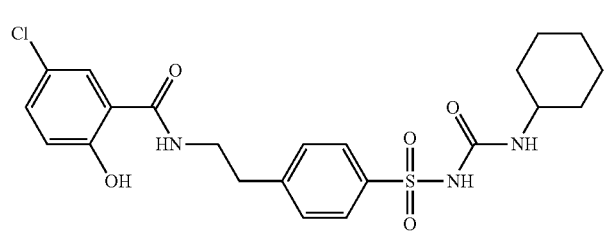

1

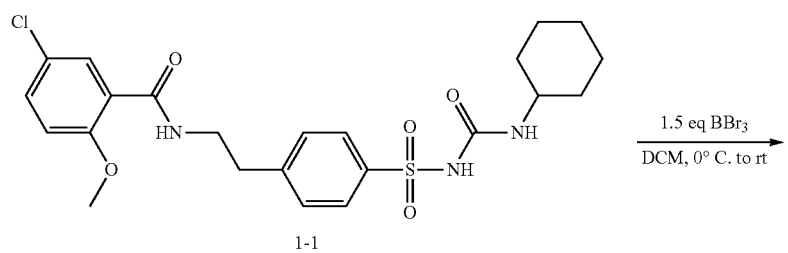

1-1

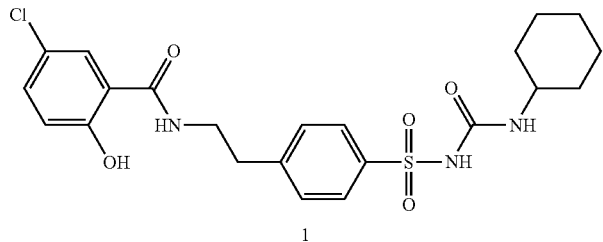

1

To a 50 mL reaction flask were added compound 1-1 (986 mg, 2 mmol, purchased from Cadila pharmaceuticals limited) and DCM (10 mL) under nitrogen atmosphere. The mixture was stirred and cooled to 0° C. under an ice bath, and a solution of $BBr_3$ in DCM (3 mL, 3 mmol) was slowly added dropwise over a period of about 10 min. The mixture was stirred for 30 min while maintaining the ice bath. The ice bath was removed, and the mixture was naturally warmed to room temperature and stirred overnight. The reaction was quenched by dropwise addition of methanol (2 mL) under an ice bath. The reaction was concentrated under reduced pressure to remove the solvent. The residue was purified by column chromatography to give compound 1 (560 mg, 99.08% purity, 58.4% yield).

$^1$HNMR (d$^6$-DMSO, 400 MHz) δ1.06-1.30 (m, 5H), 1.47-1.65 (m, 5H), 2.96 (t, J=6.4 Hz, 2H), 3.32 (bs, 1H), 3.55-3.58 (m, 2H), 6.33 (d, J=7.6 Hz, 1H), 6.93 (d, J=8.8 Hz, 1H), 7.42-7.49 (m, 3H), 7.81-7.89 (m, 3H), 8.96 (s, 1H), 10.31 (bs, 1H), 12.46 (bs, 1H).

Example 2: Preparation of 5-chloro-N-(4-(N-(cyclohexylcarbamoyl)sulfamoyl)phenethyl)-2-(methoxy-d$_3$)benzamide (2)

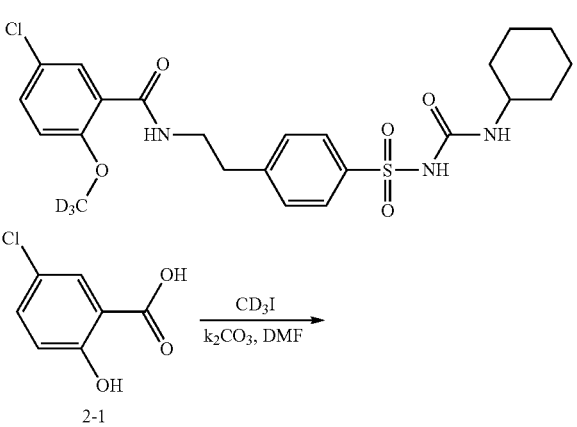

2

2-1

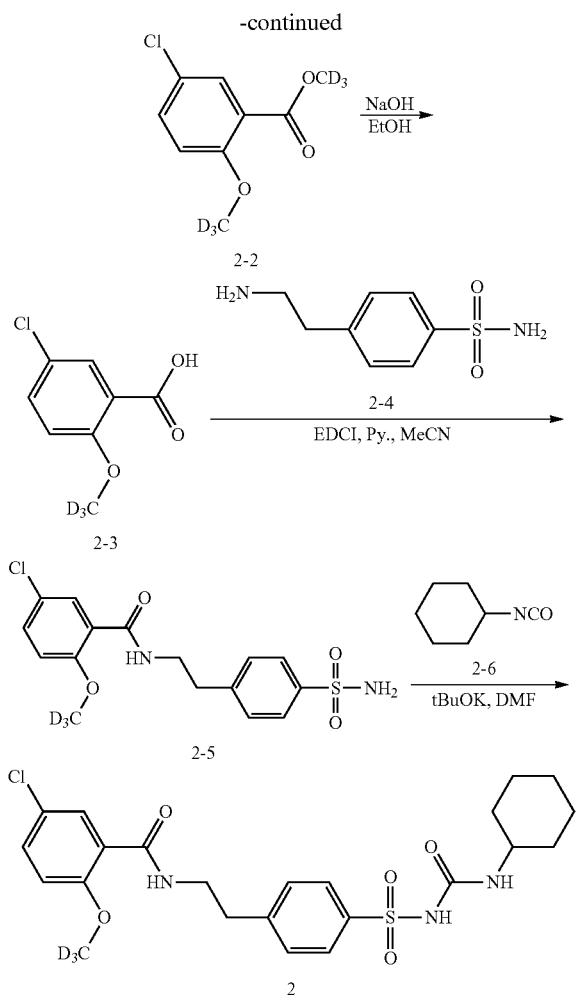

Step 1: preparation of methyl-d₃ 5-chloro-2-(methoxy-d₃)benzoate (2-2)

To a 100 mL reaction flask were added 5-chloro-2-hydroxybenzoic acid (2-1) (5.18 g, 30.0 mmol), iodomethane (7.5 mL, 75.0 mmol), potassium carbonate (8.4 g, 61.0 mmol) and DMF (15 mL) at room temperature under nitrogen atmosphere. The mixture was heated to 60° C. and stirred for about 20 h. After the reaction was completed as monitored by LCMS, water (50 mL) and methyl tert-butyl ether (100 mL) were added to the reaction solution, and the aqueous phase was extracted with methyl tert-butyl ether (2×100 mL). The organic phases were combined, dried over anhydrous sodium sulfate, filtered, and concentrated under reduced pressure. The residue was dissolved in toluene (50 mL) and washed with 5% sodium hydroxide solution (30 mL). The organic phase was dried over anhydrous sodium sulfate, filtered, and concentrated under reduced pressure to give crude product 2-2 (6.20 g), which was directly used in the next step.

Step 2: preparation of 5-chloro-2-(methoxy-d₃)benzoic acid (2-3)

To a 100 mL flask were added compound 2-2 (6.20 g, 30 mmol), ethanol (30 mL) and 10% sodium hydroxide solution (30 mL) at room temperature. The mixture was heated to reflux and stirred for 2 h. After the reaction was substantially completed as monitored, the reaction solution was cooled to room temperature, and concentrated under reduced pressure to remove ethanol. To the resulting aqueous solution was added 5% dilute hydrochloric acid (60 mL) to form a suspension, which was then stirred for 1 h and filtered. The solid was dried in vacuum to give crude product 2-3 (5.5 g, 96.7% yield over two steps, 97% purity) as an off-white solid.

Step 3: preparation of 5-chloro-2-(methoxy-d₃)-N-(4-sulfamoylphenethyl)benzamide (2-5)

To a 50 mL reaction flask were added compound 2-3 (3.79 g, 20.0 mmol), 4-(2-aminoethyl)benzenesulfonamide (2-4) (4.01 g, 20.0 mmol) and MeCN (15 mL) under nitrogen atmosphere. The mixture was stirred and cooled under an ice bath. Pyridine (2.5 mL, 40.0 mmol) and EDCI (3.84 g, 20.0 mmol) were added, and the mixture was stirred for 30 min while maintaining the ice bath. The ice bath was removed, and the mixture was naturally warmed to room temperature and stirred overnight. The reaction solution was concentrated under reduced pressure, and water (400 mL) was added at room temperature. The resulting mixture was stirred for 15 min. The reaction solution was filtered. The solid was collected and dried to give 2-5 (6.2 g, 99% purity, 83% yield) as an off-white solid, which was directly used in the next step without purification.

Step 4: preparation of 5-chloro-N-(4-(N-(cyclohexylcarbamoyl)sulfamoyl)phenethyl)-2-(methoxy-d₃)benzamide (2)

Compound 2-5 (2.23 g, 6.0 mmol) and isocyanatocyclohexane (2-6) (1.28 g, 10.2 mmol) were dissolved in DMF (16 mL). The mixture was then cooled under an ice-water bath and a solution of potassium tert-butoxide (7.8 mL, 7.8 mmol, 1 M in THF) was slowly added dropwise over a period of about 5 min. After the addition, the mixture was warmed to room temperature and stirred overnight. Water (50 mL) was added and the suspension was stirred for an additional about 10 min. The resulting material was collected and purified by preparative HPLC to give compound 2 (1.9 g, 63.8% yield, 99.6% purity).

¹HNMR (d⁶-DMSO, 400 MHz) δ 1.07-1.23 (m, 5H), 1.46-1.65 (m, 5H), 2.93 (t, J=6.4 Hz, 2H), 3.28 (bs, 1H), 3.54-3.57 (m, 2H), 6.33 (d, J=7.6 Hz, 1H), 7.14 (d, J=8.8 Hz, 1H), 7.45-7.64 (m, 4H), 7.84 (d, J=8.0 Hz, 2H), 8.27 (s, 1H), 10.31 (bs, 1H).

Example 3: Preparation of 5-chloro-N-(4-(N-(cyclohexylcarbamoyl)sulfamoyl)phenethyl)-2-(trifluoromethoxy)benzamide (3)

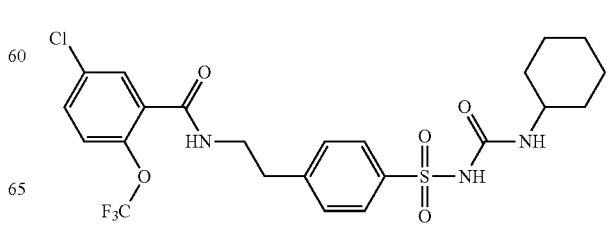

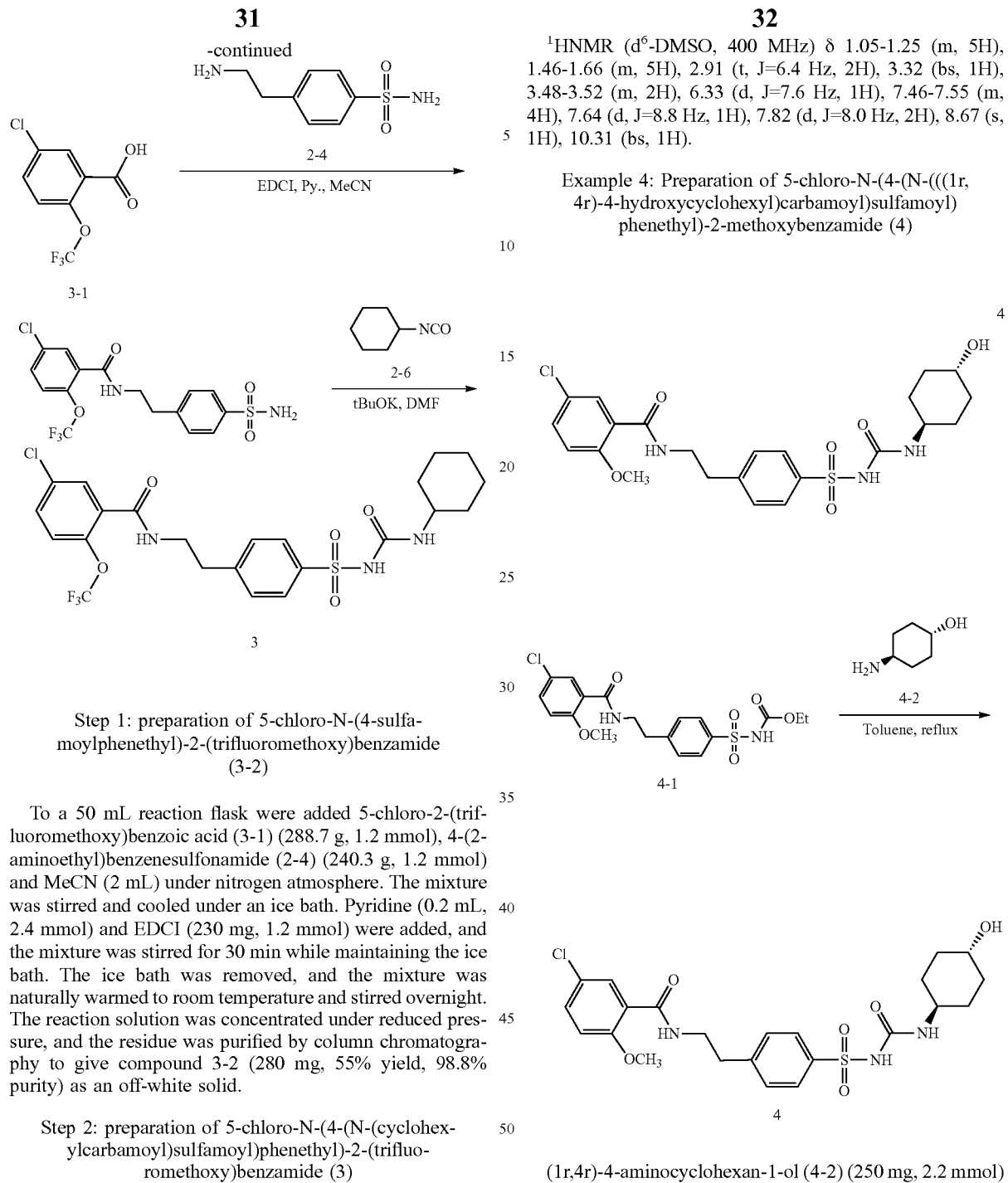

Step 1: preparation of 5-chloro-N-(4-sulfamoylphenethyl)-2-(trifluoromethoxy)benzamide (3-2)

To a 50 mL reaction flask were added 5-chloro-2-(trifluoromethoxy)benzoic acid (3-1) (288.7 g, 1.2 mmol), 4-(2-aminoethyl)benzenesulfonamide (2-4) (240.3 g, 1.2 mmol) and MeCN (2 mL) under nitrogen atmosphere. The mixture was stirred and cooled under an ice bath. Pyridine (0.2 mL, 2.4 mmol) and EDCI (230 mg, 1.2 mmol) were added, and the mixture was stirred for 30 min while maintaining the ice bath. The ice bath was removed, and the mixture was naturally warmed to room temperature and stirred overnight. The reaction solution was concentrated under reduced pressure, and the residue was purified by column chromatography to give compound 3-2 (280 mg, 55% yield, 98.8% purity) as an off-white solid.

Step 2: preparation of 5-chloro-N-(4-(N-(cyclohexylcarbamoyl)sulfamoyl)phenethyl)-2-(trifluoromethoxy)benzamide (3)

Compound 3-2 (280 mg, 6.0 mmol) and isocyanatocyclohexane (2-6) (140 mg, 1.12 mmol) were dissolved in DMF (2.5 mL). The mixture was then cooled under an ice-water bath and a solution of potassium tert-butoxide (0.86 mL, 0.86 mmol, 1 M in THF) was slowly added dropwise over a period of about 5 min. After the addition, the mixture was warmed to room temperature and stirred overnight. Water (5 mL) was added and no solid was precipitated. The mixture was extracted with ethyl acetate (3×10 mL). The organic phases were combined, dried over anhydrous sodium sulfate, and filtered, and the filtrate was concentrated under reduced pressure. The residue was purified by preparative HPLC to give compound 3 (240 mg, 66.4% yield, 99.69% purity).

$^1$HNMR (d$^6$-DMSO, 400 MHz) δ 1.05-1.25 (m, 5H), 1.46-1.66 (m, 5H), 2.91 (t, J=6.4 Hz, 2H), 3.32 (bs, 1H), 3.48-3.52 (m, 2H), 6.33 (d, J=7.6 Hz, 1H), 7.46-7.55 (m, 4H), 7.64 (d, J=8.8 Hz, 1H), 7.82 (d, J=8.0 Hz, 2H), 8.67 (s, 1H), 10.31 (bs, 1H).

Example 4: Preparation of 5-chloro-N-(4-(N-(((1r,4r)-4-hydroxycyclohexyl)carbamoyl)sulfamoyl)phenethyl)-2-methoxybenzamide (4)

(1r,4r)-4-aminocyclohexan-1-ol (4-2) (250 mg, 2.2 mmol) and ethyl ((4-(2-(5-chloro-2-methoxybenzamido)ethyl)phenyl)sulfonyl)carbamate (4-1) (880 mg, 2.0 mmol, synthesized according to the method described in the literature (*Bioorganic & Medicinal Chemistry*, 2003, 11, 2099-2113)) were added to toluene (30 mL), and the mixture was heated to reflux and stirred for about 3 h. The reaction mixture was cooled to room temperature and concentrated under reduced pressure. The residue was purified by preparative HPLC to give compound 4 (420 mg, 41.2% yield, 98.85% purity).

1HNMR (d$^6$-DMSO, 400 MHz) δ 1.02-1.24 (m, 4H), 1.66-1.76 (m, 4H), 2.08 (s, 1H), 2.94 (t, J=6.4 Hz, 2H), 3.22 (bs, 1H), 3.54-3.57 (m, 2H), 3.80 (s, 3H), 4.52 (bs, 1H), 6.30 (d, J=6.0 Hz, 1H), 7.15 (d, J=8.4 Hz, 1H), 7.47-7.51 (m, 3H), 7.65 (s, 1H), 7.85 (d, J=7.2 Hz, 2H), 8.28 (s, 1H), 10.35 (bs, 1H).

Example 5: Preparation of 5-chloro-N-(4-(N-((cyclohexyl-4,4-d₂)carbamoyl)sulfamoyl)phenethyl)-2-methoxybenzamide (5)

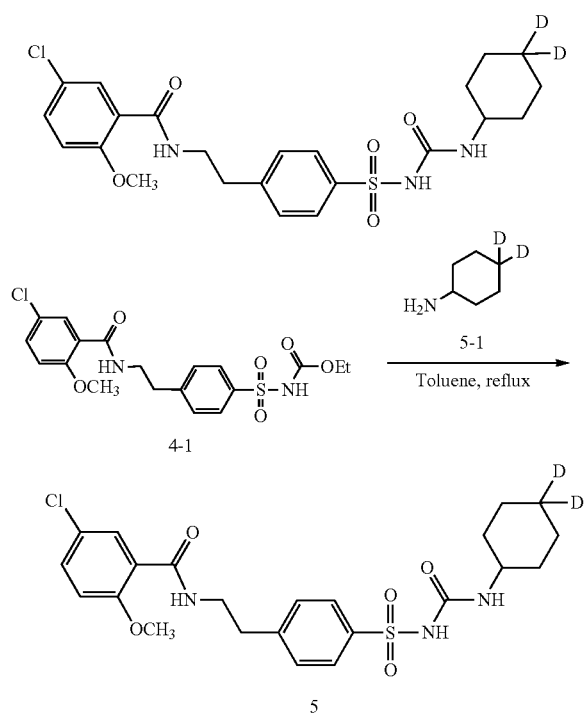

Ethyl ((4-(2-(5-chloro-2-methoxybenzamido)ethyl)phenyl)sulfonyl)carbamate (4-1) (137 mg, 1.36 mmol) and cyclohexan-4,4-d₂-1-amine (5-1) (500 mg, 1.13 mmol) were added to toluene (30 mL), and the mixture was heated to reflux and stirred for about 6 h. The reaction mixture was cooled to room temperature and concentrated under reduced pressure. The residue was purified by preparative HPLC to give compound 5 (380 mg, 67.9% yield, 100% HPLC purity).

¹HNMR (d⁶-DMSO, 400 MHz) δ 1.04-1.23 (m, 4H), 1.54-1.66 (m, 4H), 2.93 (t, J=6.4 Hz, 2H), 3.28 (bs, 1H), 3.53-3.56 (m, 2H), 3.79 (s, 3H), 6.33 (d, J=6.4 Hz, 1H), 7.15 (d, J=8.8 Hz, 1H), 7.46-7.50 (m, 3H), 7.63 (s, 1H), 7.84 (d, J=7.6 Hz, 2H), 8.27 (bs, 1H), 10.31 (bs, 1H).

Example 6: Preparation of 5-chloro-N-(4-(N-(((1R,2R)-2-cyanocyclohexyl)carbamoyl)sulfamoyl)phenethyl)-2-methoxybenzamide (6)

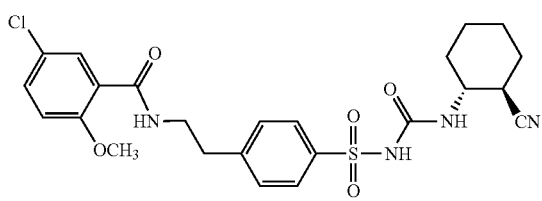

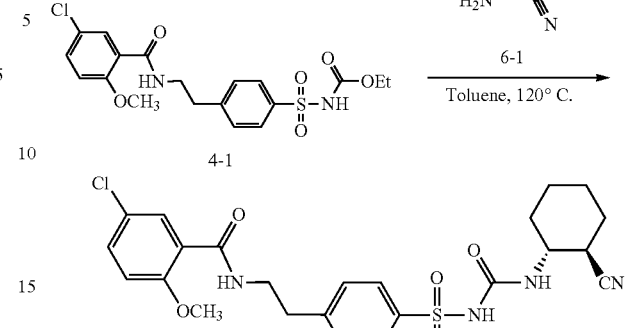

(1R,2R)-2-aminocyclohexane-1-carbonitrile (6-1) (0.1 g, 0.80 mmol) was dissolved in dried toluene (4 mL), and ethyl ((4-(2-(5-chloro-2-methoxybenzamido)ethyl)phenyl)sulfonyl)carbamate (4-1) (0.44 g, 0.96 mmol) was added. The mixture was refluxed at 120° C. for 4 h. The reaction solution was cooled to room temperature and concentrated under reduced pressure to remove the solvent. The residue was purified by pre-HPLC to give compound 6 (43 mg, 96.6% HPLC purity, 10% yield).

¹HNMR (d6-DMSO, 400 MHz) δ 1.03-1.24 (m, 3H), 1.45-1.58 (m, 4H), 1.95-1.99 (m, 1H), 2.80 (t, J=6.4 Hz, 1H), 2.92 (t, J=6.4 Hz, 2H), 3.52-3.56 (m, 3H), 3.79 (s, 3H), 6.79 (d, J=7.6 Hz, 1H), 7.15 (d, J=8.8 Hz, 1H), 7.44-7.51 (m, 3H), 7.64 (s, 1H), 7.84 (d, J=7.2 Hz, 2H), 8.26 (bs, 1H), 10.93 (bs, 1H).

Example 7: Preparation of 5-cyano-N-(4-(N-(cyclohexylcarbamoyl)sulfamoyl)phenethyl)-2-methoxybenzamide (7)

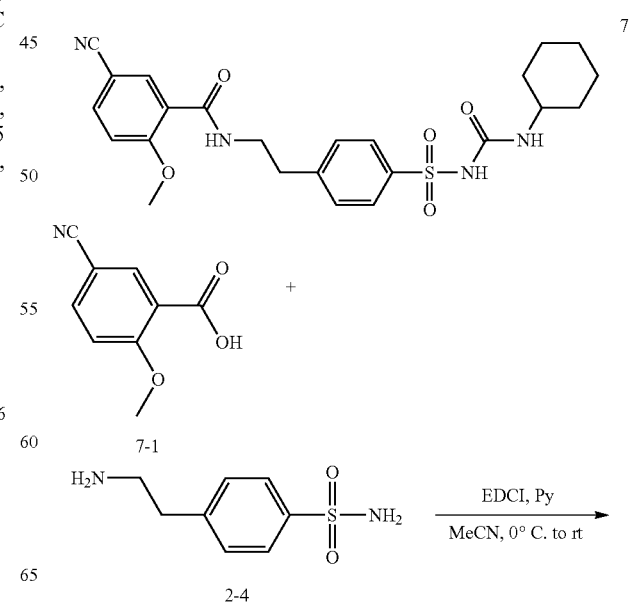

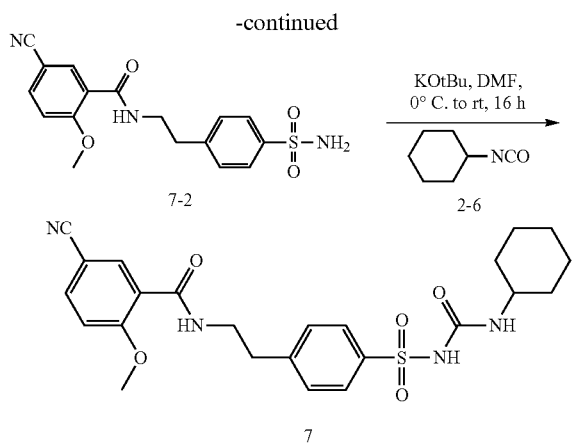

Step 1: preparation of 5-cyano-2-methoxy-N-(4-sulfamoylphenethyl)benzamide (7-2)

To a 25 mL reaction flask were added 5-cyano-2-methoxybenzoic acid (7-1) (500 mg, 2.82 mmol), 4-(2-aminoethyl)benzenesulfonamide (2-4) (565.8 mg, 2.82 mmol) and MeCN (2.8 mL) under nitrogen atmosphere. The mixture was stirred and cooled under an ice bath. Pyridine (697 mg, 8.81 mmol) and EDCI (541 mg, 2.82 mmol) were added, and the mixture was stirred for 30 min while maintaining the ice bath. The ice bath was removed, and the mixture was naturally warmed to room temperature and stirred overnight. The reaction solution was concentrated under reduced pressure, and water (2.5 mL) was added. The resulting mixture was stirred for 30 min. The reaction solution was filtered. The solid was collected and dried to give compound 7-2 (934 mg, 92% reaction yield) as an off-white solid, which was directly used in the next step without purification.

Step 2: preparation of 5-cyano-N-(4-(N-(cyclohexylcarbamoyl)sulfamoyl)phenethyl)-2-methoxybenzamide (7)

To a 25 mL flask were added compound 7-2 (567 mg, 1.578 mmol), isocyanatocyclohexane (2-6) (316 mg, 2.525 mmol), and DMF (5 mL) at room temperature under nitrogen atmosphere. The mixture was dissolved with stirring and cooled under an ice bath, and a solution of KOtBu in THF (2.4 mL, 2.4 mmol) was added dropwise. The resulting mixture was stirred for 10 minutes while maintaining the ice bath. The ice bath was removed, and the mixture was naturally warmed to room temperature and stirred overnight. The reaction system was diluted with water (15 mL), stirred for 5 min and filtered, and the residue was diluted with ethyl acetate, stirred for 30 min and filtered. The solid was washed once with a small amount of ethyl acetate, collected, slurried with DCM:MeOH=10:1 (4 mL) at room temperature for 30 min, and filtered. The solid was collected to give compound 7 (220 mg, 95.9% purity, 28.8% yield).

$^1$HNMR (d$^6$-DMSO, 400 MHz) δ 1.05-1.23 (m, 5H), 1.46-1.65 (m, 5H), 2.93 (t, J=6.4 Hz, 2H), 3.28 (bs, 1H), 3.52-3.56 (m, 2H), 3.87 (s, 3H), 6.34 (d, J=7.6 Hz, 1H), 7.30 (d, J=8.0 Hz, 1H), 7.49 (d, J=7.6 Hz, 2H), 7.84 (d, J=8.0 Hz, 2H), 7.92-7.97 (m, 2H), 8.32 (bs, 1H), 10.32 (bs, 1H).

BIOLOGICAL ASSAY

Test Example 1: Binding Activity of the Compounds of the Present Disclosure for SUR1 Receptor

| Reagent | Supplier | Cat. No. |
|---|---|---|
| SUR1 RECEPTOR MEMBRANE | JIANGSU HENGRUI MEDICINE CO., LTD. | |
| Glibenclamide, Glyburide, [Cyclohexyl-2,3-3H(N)]-(9.25 MBq) | Perkin Elmer | NET1024250UC |
| Glipizide | MCE | HY-B0254 |
| ULTIMA GOLD | Perkin Elmer | 77-16061 |
| 96-well round-bottom deep-well plate, 1.1 mL | Perkin Elmer | P-DW-11-C |
| 384-well round-bottom plate | corning | 3657 |
| UNIFILTER-96 GF/B filter plate | Perkin Elmer | 6005177 |
| Polyethyleneimine (PEI) | sigma | 408727 |
| Centrifuge tube (15 mL, 50 mL) | BD | 352096, 352070 |
| Loading slot | Jet biofil | LTT001050 |
| TIP (10 μL, 200 μL, 1 ml) | AXYGEN | T-300-R-S T-200-Y-R-S T-1000-B-R-S |
| MgCl$_2$ | sigma | 7786-30-3 |
| HEPES | sigma | 7365-45-9 |
| 5'-adenosine triphosphate disodium salt hydrate/ATP | sigma | A2383 |

| Instruments | Supplier | Model |
|---|---|---|
| Vortex mixer | IKA | MS3 BASIC |
| Electric thermostatic incubator | Shanghai Yiheng | DHP-9032 |
| Microplate shaker | VWR | 12620-928 |
| TopCount | Perkin Elmer | NTX |
| Universal Harvester | Perkin Elmer | UNIFILTER-96 |

| Reaction buffer | | | |
|---|---|---|---|
| Name | Stock solution concentration | Mass/volume | Final concentration |
| HEPES | 1M | 15 mL | 30 mM |
| MgCl$_2$ | 1M | 1 mL | 2 mM |

-continued

Reaction buffer

| Name | Stock solution concentration | Mass/volume | Final concentration |
|---|---|---|---|
| ATP-Na$_2$ | Powder | 0.55 g | 2 mM |
| H$_2$O | — | Making up with water to 500 mL (500 mL) pH 7.4 | — |

Washing solution

| Name | Stock solution concentration | Mass/volume | Final concentration |
|---|---|---|---|
| NaCl | Powder | 13.5 g 1.5 L | 0.9% |

Procedures:
a) 100 μL of reaction buffer was added to each well of a 96-well deep-well plate.
b) 5 μL of diluted test compound (1% DMSO) was added to each well of the 96-well deep-well plate.
c) 30 μL of SUR1 membrane protein and 270 μL of reaction mixture were added to each well, and the plate was shaken at 600 rpm for 5 min.
d) A mixed solution of 100 μL of reaction buffer and [3H]-Glibenclamide (final concentration of 2 nM) was added to the reaction system, and the plate was shaken at 600 rpm for 5 min and incubated at 37° C. for 1 h.
e) A UNIFILTER-96 GF/B plate was pretreated with 0.5% PEI, and 150 μL of 0.5% PEI was added to each well. The plate was incubated at 4° C. for 1 h.
f) The UNIFILTER-96 GF/C and UNIFILTER-96 GF/B plates were washed twice with Universal Harvester, each time with 50 mL of washing solution.
g) The SUR1 receptor reaction system was transferred to a UNIFILTER-96 GF/B plate with Universal Harvester, and 900 μL of washing solution was added to each well to wash the GF/B plate 4 times. The washed UNIFILTER-96 GF/B plate was dried in an oven at 55° C. for 10 min.
h) 40 μL of ULTIMA GOLD scintillation solution was added to each well, and the plate was read using Microbeta.
Results: the binding activity of the compounds of the present disclosure for the SUR1 receptor is shown in Table 1 below.

TABLE 1

Binding activity of the compounds of the present disclosure for the SUR1 receptor

| Compound | IC$_{50}$ (nM) |
|---|---|
| Glipizide | 229.592 |
| Glibenclamide | 6 |
| Compound 1 | 12.695 |
| Compound 2 | 9 |
| Compound 3 | 159 |
| Compound 4 | 8 |
| Compound 5 | 9 |
| Compound 6 | 37 |
| Compound 7 | 6 |

Test Example 2: Assay on In Vivo Pharmacokinetics and Brain Tissue Distribution of Different Compounds Administered by Intravenous Injection in SD Rats Preparation of Test Sample 1. An appropriate amount of compound 1, compound 4, compound 7 or glibenclamide was accurately weighed, and an appropriate volume of 5% DMSO+10% Solutol+85% normal saline was added thereto. The mixture was stirred or sonicated until completely dissolved to obtain a clear solution at a concentration of 1 mg/mL for administration by intravenous injection.

2. An appropriate amount of compound 3 or compound 6 was accurately weighed, and an appropriate volume of 5% DMSO+20% PG+20% PEG400+55% PBS (pH 8.0) was added thereto. The mixture was stirred or sonicated until completely dissolved to obtain a clear solution at a concentration of 1 mg/mL for administration by intravenous administration.

Experimental Animals

SPF grade SD rats, source: animals were transferred from the laboratory animal reserve bank (999M-017), Shanghai Sippe-Bk Lab Animal Co., Ltd.

Design of experiment

| Group | Test compounds | Number Male** | Dose (mg/kg) | Concentration (mg/mL) | Volume for administration (mL/kg) | Route of administration | Sample type |
|---|---|---|---|---|---|---|---|
| 1 | Compound 1 | 6 | 5 | 1 | 5 | IV | Blood and tissue samples |
| 2 | Compound 3 | 6 | 5 | 1 | 5 | IV | Blood and tissue samples |
| 3 | Compound 4 | 6 | 5 | 1 | 5 | IV | Blood and tissue samples |
| 4 | Compound 6 | 6 | 5 | 1 | 5 | IV | Blood and tissue samples |
| 5 | Compound 7 | 6 | 5 | 1 | 5 | IV | Blood and tissue samples |
| 6 | Glibenclamide | 6 | 5 | 1 | 5 | IV | Blood and tissue samples |

Collection Time Point 3 rats/time point was set, blood samples were collected from the first 3 rats in each group, and cerebrospinal fluid and brain tissue were collected from the last 3 rats in each group. Blood sample: before administration and 5 min, 0.25 h, 0.5 h, 1 h, 1.5 h, 2 h, 4 h, 6 h, 8 h, 12 h and 24 h after administration. Tissue sample: cerebrospinal fluid and brain tissue were collected 10 min after administration.

Sample Collection and Processing

Blood sample: blood was collected via jugular vein or other suitable means, and about 0.20 mL of blood was collected from each rat and added into an EDTA-K2 anticoagulation tube, which was then placed on ice after collection and centrifuged within 2 h for plasma separation (centrifugation conditions: 6800 g, 6 min, 2-8° C.). The collected plasma samples were stored in a refrigerator at −70° C. before analysis, and the residual plasma samples after analysis were still stored in the refrigerator at −70° C. for subsequent processing according to the requirements of the sponsor.

Tissue sample: cerebrospinal fluid and brain tissues were collected from animals used for tissue collection 10 min after administration, and the brain tissues were separately washed with normal saline to avoid cross contamination, dried with filter paper, and weighed. The tissues were then placed in marked tubes (one tube for each tissue), and the samples were temporarily placed on ice prior to storage in a refrigerator at −70° C.

The collected plasma samples and the collected tissue samples were stored in a refrigerator at −70° C. before analysis, and the residual plasma samples and the residual tissue samples after analysis were still stored in the refrigerator at −70° C. for subsequent processing according to the requirements of the sponsor.

Biological Analysis and Data Processing

The concentration of each test compound in the plasma and tissue samples was determined. The accuracy of quality control samples was evaluated while analyzing the samples, and more than 66% of the quality control samples were required to have an accuracy between 80% and 120%.

The pharmacokinetic parameters such as AUC(0-t), T½, Cmax, Tmax and MRT were calculated from plasma concentration data at different time points using WinNonlin.

When plasma drug concentration-time curves were plotted, BLQ was recorded as 0. When the pharmacokinetic parameters were calculated, the concentration before administration was calculated as 0; BLQ before Cmax (including "No peak") was calculated as 0; and BLQ that occurs after Cmax (including "No peak") was excluded from the calculation.

The invention claimed is:

1. A compound of general formula (I), or a pharmaceutically acceptable salt thereof,

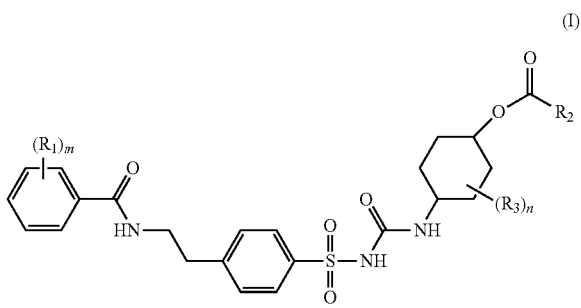

wherein, each $R_1$ is independently selected from the group consisting of deuterium, alkyl optionally substituted with halogen, halogen, hydroxy, mercapto, —$NR_iR_j$, —$C(O)R_k$, —$C(O)OR_k$, nitro, cyano, alkoxy optionally substituted with halogen, and alkylthio;

$R_2$ is selected from the group consisting of alkyl, alkoxy, alkenyl, alkynyl, aryl, heteroaryl, cycloalkyl and heterocyclyl, wherein the alkyl, alkoxy, alkenyl, alkynyl, aryl, heteroaryl, cycloalkyl and heterocyclyl are optionally further substituted with one or more groups selected from the group consisting of deuterium, alkyl, haloalkyl, halogen, hydroxy, oxo, mercapto, —$NR_iR_j$, —$C(O)R_k$, —$C(O)OR_k$, —$SR_i$, —$S(O)R_i$, —$SO_2R_i$, nitro, cyano, aryl optionally substituted with hydroxy or alkoxy, heteroaryl optionally substituted with oxo or alkyl, heterocyclyl optionally substituted with oxo or alkyl, cycloalkyl optionally substituted with oxo or alkyl, optionally substituted alkenyl, optionally substituted alkynyl, alkoxy, and alkylthio;

each $R_3$ is independently selected from the group consisting of deuterium, alkyl optionally substituted with halogen, halogen, hydroxy, mercapto, —$NR_iR_j$, —$C(O)R_k$, —$C(O)OR_k$, nitro, cyano, alkoxy, and alkylthio;

TABLE 2

Changes in the concentration of the compounds in plasma after a single intravenous injection

| | Compound 1 | Compound 3 | Compound 4 | Compound 6 | Compound 7 | Glibenclamide |
|---|---|---|---|---|---|---|
| $T_{1/2}$ (h) | 3.9 ± 0.6 | 2.6 ± 0.1 | 3.1 ± 3.4 | 5.4 ± 2.1 | 1.9 ± 0.2 | 2.5 ± 0.1 |
| $T_{max}$ (h) | 0.1 ± 0 | 0.1 ± 0 | 0.1 ± 0 | 0.1 ± 0 | 0.1 ± 0 | 0.1 ± 0 |
| $C_{max}$ (ng/ml) | 64998.1 ± 3633.1 | 32785.3 ± 1528.9 | 39579.7 ± 4734.8 | 11788.2 ± 1063.3 | 42446.6 ± 8443.2 | 36629.6 ± 682.2 |
| $AUC_{(0-t)}$ (h* ng/ml) | 28194 ± 5043.5 | 35659.2 ± 1128.5 | 12941.9 ± 1457.5 | 4655.9 ± 259.3 | 28485.9 ± 7925.3 | 23608.2 ± 688.1 |
| $AUC_{(0-\infty)}$ (h* ng/ml) | 28737.1 ± 4700.2 | 36400.5 ± 1168.2 | 12980 ± 1478.6 | 4981.9 ± 288 | 28561.4 ± 7915.1 | 23829.9 ± 705.3 |
| $MRT_{(0-t)}$ (h) | 0.9 ± 0.3 | 1.9 ± 0.1 | 0.3 ± 0.1 | 0.7 ± 0.1 | 1 ± 0 | 1.1 ± 0.1 |
| $MRT_{(0-\infty)}$ (h) | 1.2 ± 0.1 | 2.2 ± 0.1 | 0.3 ± 0.1 | 3.6 ± 4.8 | 1.1 ± 0 | 1.2 ± 0.1 |
| Vss (ml/kg) | 219.1 ± 26.3 | 303.5 ± 14.1 | 118.6 ± 12.3 | 3439.6 ± 4529.2 | 192.7 ± 46.9 | 253.4 ± 20 |
| Vz (ml/kg) | 1000.9 ± 202.4 | 509.8 ± 30.7 | 1655.1 ± 1733.9 | 14571.4 ± 19059.9 | 499.9 ± 160.3 | 768.9 ± 16.8 |

Note:
the dose is 5 mg/kg for all the test compounds; and the lower limit of quantitation varies from 5 to 30 ng/ml.

$R_i$ and $R_j$ are each independently selected from the group consisting of hydrogen, hydroxy, alkyl, cycloalkyl, alkoxy, and —C(=NH)—NH$_2$;

$R_k$ is selected from the group consisting of alkyl, alkoxy, aryl, alkenyl and alkynyl, wherein the alkyl, alkoxy, aryl, alkenyl and alkynyl are optionally further substituted with one or more groups selected from the group consisting of aryl, heteroaryl, heterocyclyl, cycloalkyl, alkyl and alkoxy;

m is an integer selected from the group consisting of 0 to 5;

n is an integer selected from the group consisting of 0 to 10; and $R_2$ is not

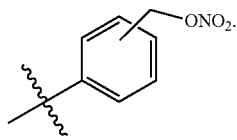

2. The compound of general formula (I) or the pharmaceutically acceptable salt thereof according to claim 1, wherein $R_1$ is selected from the group consisting of halogen, $C_1$-$C_6$ alkoxy, $C_1$-$C_6$ alkyl optionally substituted with halogen, and cyano.

3. The compound of general formula (I) or the pharmaceutically acceptable salt thereof according to claim 1, wherein $R_1$ is selected from the group consisting of Cl, OCH$_3$, OCD$_3$, CN, OH, and OCF$_3$.

4. The compound of general formula (I) or the pharmaceutically acceptable salt thereof according to claim 1, wherein, $R_2$ is selected from the group consisting of

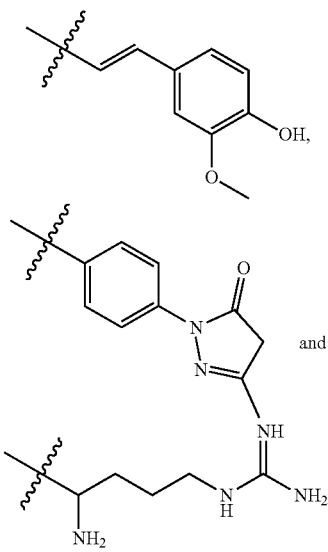

5. The compound of general formula (I) or the pharmaceutically acceptable salt thereof according to claim 1, wherein n is 0.

6. The compound of general formula (I) or the pharmaceutically acceptable salt thereof according to claim 1, wherein n is 0, and $R_1$ is selected from the group consisting of halogen, $C_1$-$C_6$ alkoxy, $C_1$-$C_6$ alkyl optionally substituted with halogen, and cyano.

7. The compound of general formula (I) or the pharmaceutically acceptable salt thereof according to claim 1, wherein n is 0, and $R_1$ is selected from the group consisting of Cl, OCH$_3$, CN, OH, and OCF$_3$.

8. The compound of general formula (I) or the pharmaceutically acceptable salt thereof according to claim 1, wherein n is 0, and $R_2$ is selected from the group consisting of

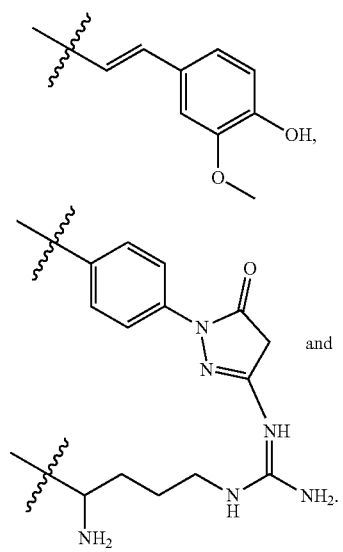

9. The compound of general formula (I) or the pharmaceutically acceptable salt thereof according to claim 1, wherein, $R_1$ is selected from the group consisting of halogen, $C_1$-$C_6$ alkoxy, $C_1$-$C_6$ alkyl optionally substituted with halogen, and cyano, $R_2$ is selected from the group consisting of

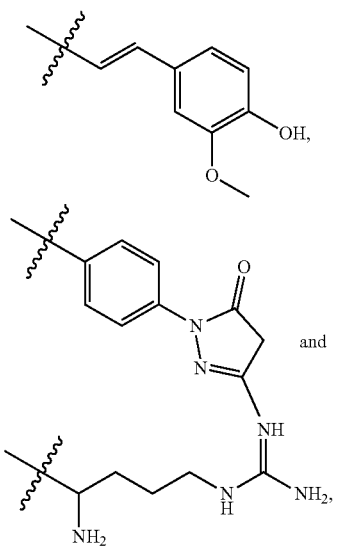

and n is 0.

10. The compound of general formula (I) or the pharmaceutically acceptable salt thereof according to claim 1, wherein, $R_1$ is selected from the group consisting of Cl, $OCH_3$, CN, OH and $OCF_3$, $R_2$ is selected from the group consisting of

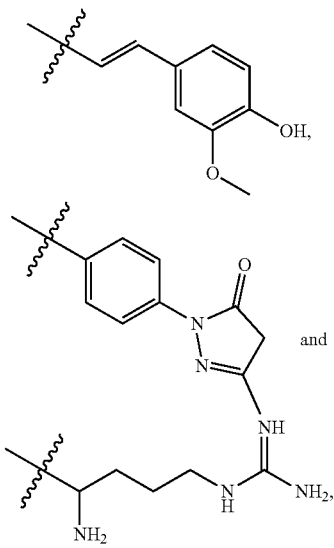

and n is 0.

11. A compound of general formula (I-1), or a pharmaceutically acceptable salt thereof,

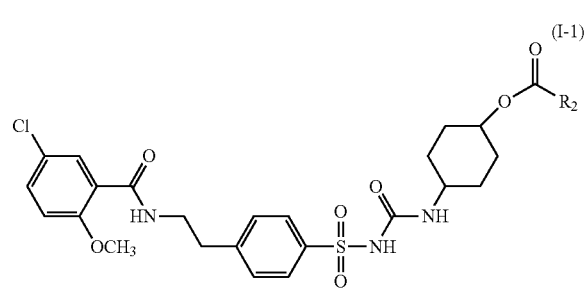

(I-1)

wherein, $R_2$ is selected from the group consisting of alkyl, alkoxy, alkenyl, alkynyl, aryl, heteroaryl, cycloalkyl and heterocyclyl, wherein the alkyl, alkoxy, alkenyl, alkynyl, aryl, heteroaryl, cycloalkyl and heterocyclyl are optionally further substituted with one or more groups selected from the group consisting of deuterium, alkyl, haloalkyl, halogen, hydroxy, oxo, mercapto, $-NR_iR_j$, $-C(O)R_k$, $-C(O)OR_k$, $-SR_i$, $-S(O)R_i$, $-SO_2R_i$, nitro, cyano, aryl optionally substituted with hydroxy and/or alkoxy, heteroaryl optionally substituted with oxo and/or alkyl, heterocyclyl optionally substituted with oxo and/or alkyl, cycloalkyl optionally substituted with oxo and/or alkyl, optionally substituted alkenyl, optionally substituted alkynyl, alkoxy, and alkylthio;

$R_i$ and $R_j$ are each independently selected from the group consisting of hydrogen, hydroxy, alkyl, cycloalkyl, alkoxy, and $-C(=NH)-NH_2$;

$R_k$ is selected from the group consisting of alkyl, alkoxy, aryl, alkenyl and alkynyl, wherein the alkyl, alkoxy, aryl, alkenyl and alkynyl are optionally further substituted with one or more groups selected from the group consisting of aryl, heteroaryl, heterocyclyl, cycloalkyl, alkyl and alkoxy;

and $R_2$ is not

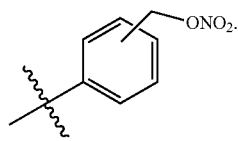

12. The compound of general formula (I-1) or a pharmaceutically acceptable salt thereof according to claim 11, wherein $R_2$ is selected from the group consisting of $C_1$-$C_6$ alkyl, $C_2$-$C_6$ alkenyl, and $C_6$-$C_{10}$ aryl; wherein the $C_1$-$C_6$ alkyl is optionally substituted with $C_6$-$C_{10}$ aryl or $-NR_iR_j$, wherein $R_i$ and $R_j$ are each independently selected from the group consisting of hydrogen and $-C(=NH)-NH_2$; the $C_6$-$C_{10}$ aryl is optionally substituted with hydroxy and/or $C_1$-$C_6$ alkoxy, or the $C_6$-$C_{10}$ aryl is optionally substituted with 5- to 7-membered heterocyclyl, wherein the 5- to 7-membered heterocyclyl is optionally substituted with oxo and/or $C_1$-$C_6$ alkyl; and the $C_2$-$C_6$ alkenyl is optionally substituted with $C_6$-$C_{10}$ aryl, wherein the aryl is optionally substituted with hydroxy and/or $C_1$-$C_6$ alkoxy.

13. A compound as shown below, or a pharmaceutically acceptable salt thereof,

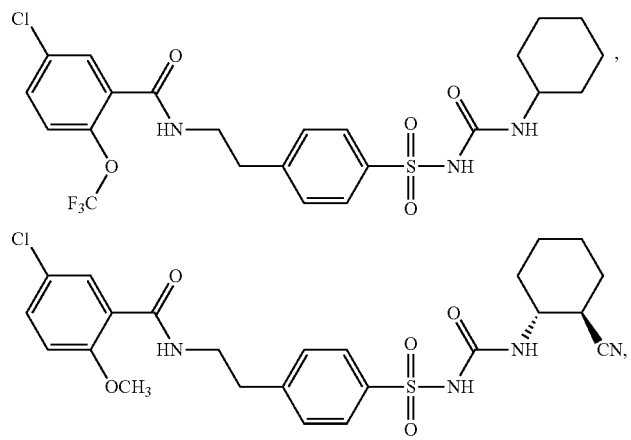

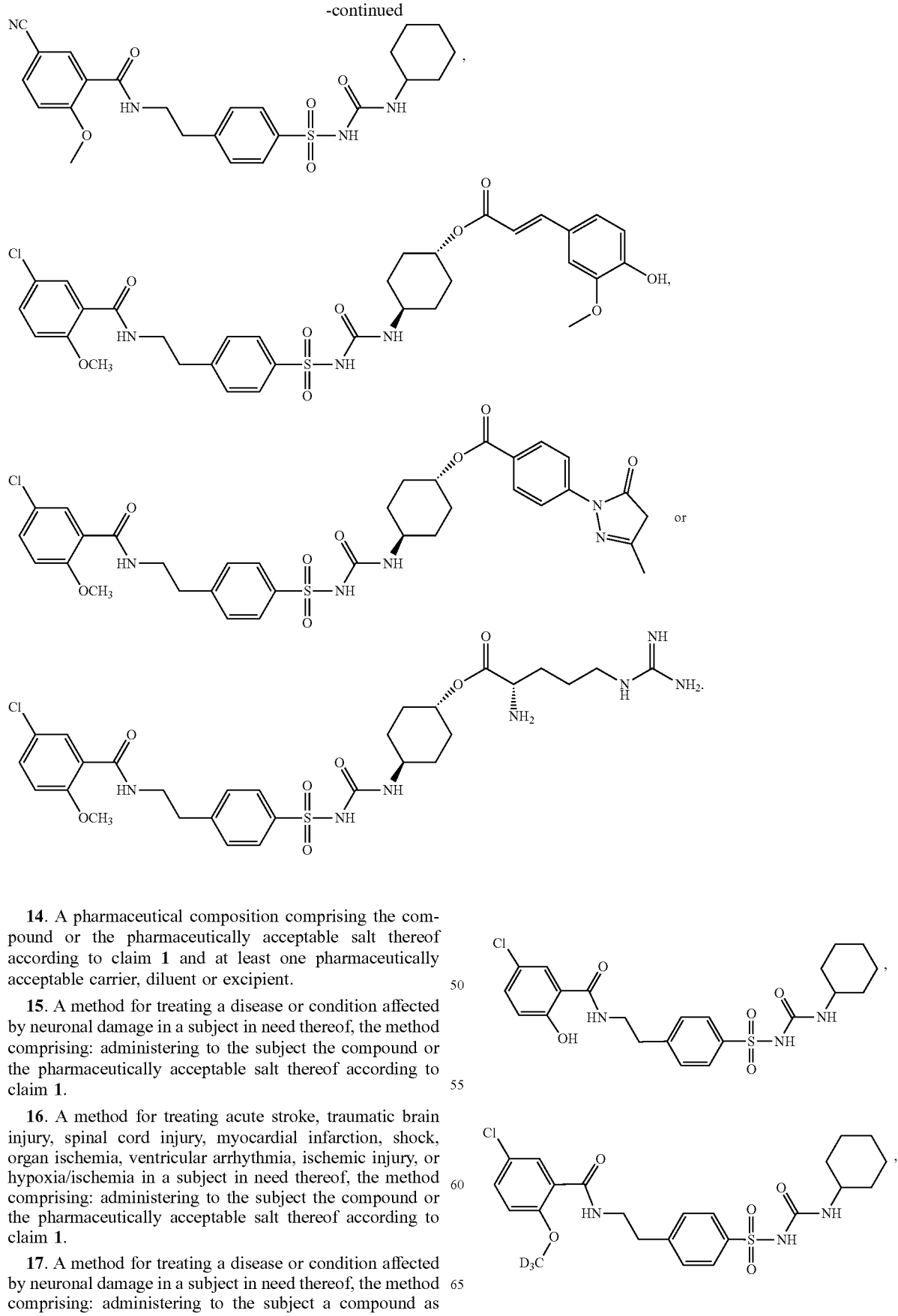

14. A pharmaceutical composition comprising the compound or the pharmaceutically acceptable salt thereof according to claim 1 and at least one pharmaceutically acceptable carrier, diluent or excipient.

15. A method for treating a disease or condition affected by neuronal damage in a subject in need thereof, the method comprising: administering to the subject the compound or the pharmaceutically acceptable salt thereof according to claim 1.

16. A method for treating acute stroke, traumatic brain injury, spinal cord injury, myocardial infarction, shock, organ ischemia, ventricular arrhythmia, ischemic injury, or hypoxia/ischemia in a subject in need thereof, the method comprising: administering to the subject the compound or the pharmaceutically acceptable salt thereof according to claim 1.

17. A method for treating a disease or condition affected by neuronal damage in a subject in need thereof, the method comprising: administering to the subject a compound as shown below or a pharmaceutically acceptable salt thereof,

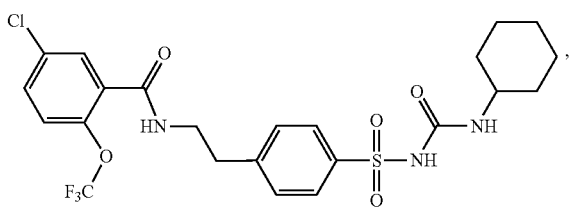
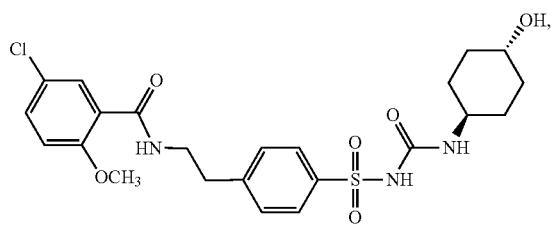
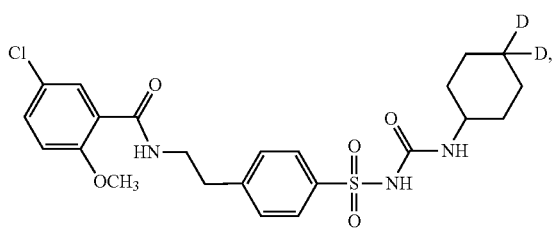
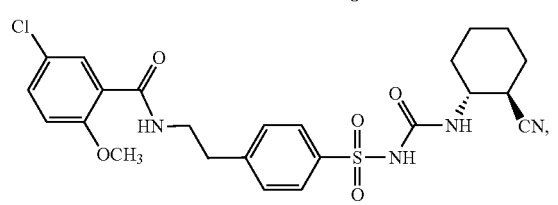
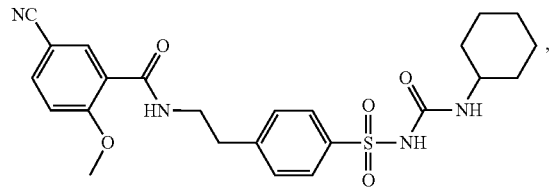
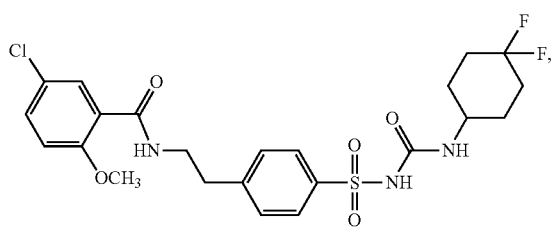
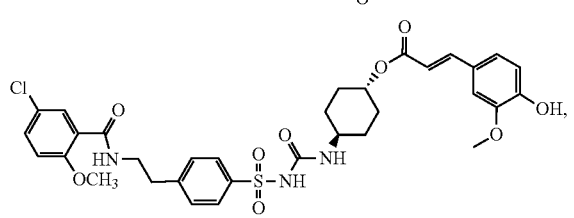
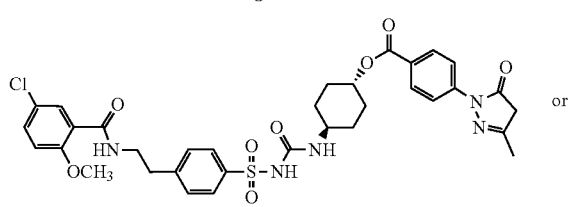
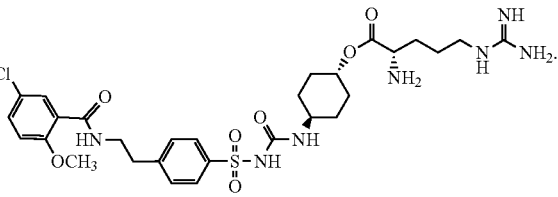
18. A method for treating a disease or condition affected by neuronal damage in a subject in need thereof, the method comprising: administering to the subject a compound as shown below or a pharmaceutically acceptable salt thereof,
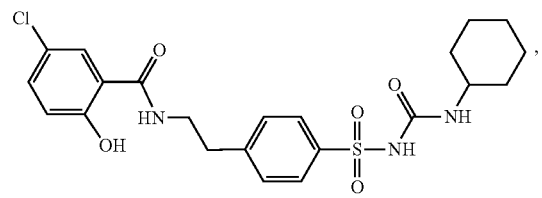
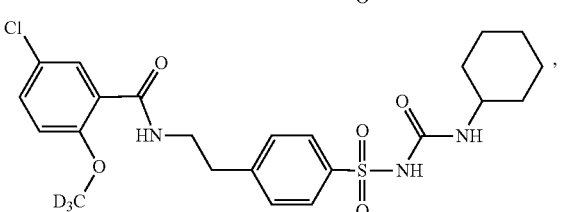
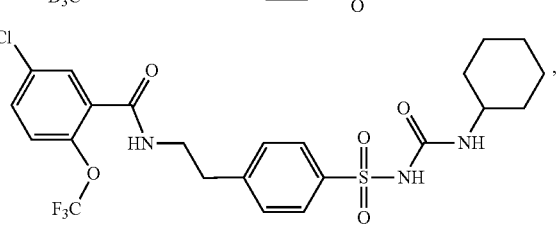
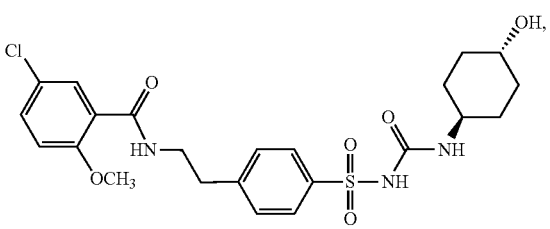
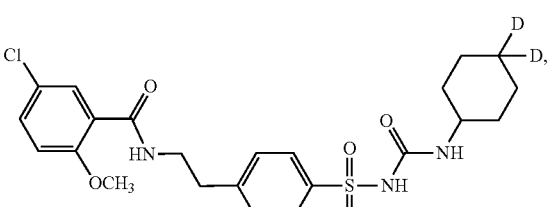
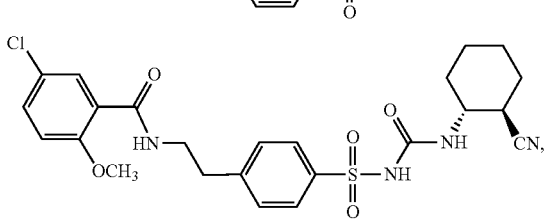

49
-continued
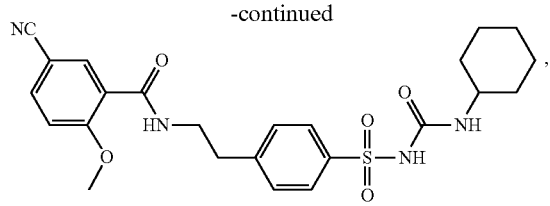
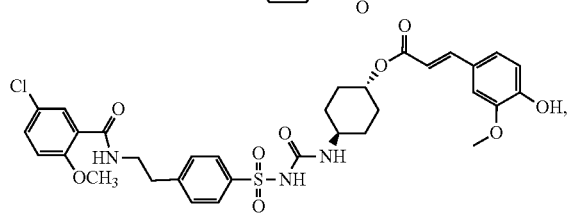
50
-continued
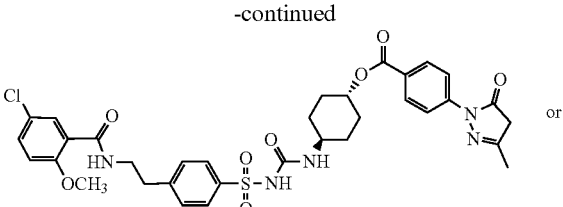
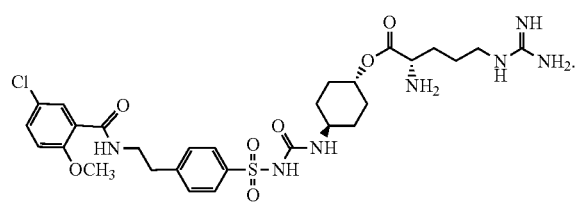
* * * * *